(12) United States Patent
Connor et al.

(10) Patent No.: US 10,807,162 B2
(45) Date of Patent: Oct. 20, 2020

(54) SYSTEM AND METHOD FOR ADDITIVE METAL MANUFACTURING

(71) Applicant: NanoCore Technologies, Inc., San Francisco, CA (US)

(72) Inventors: Stephen T. Connor, San Francisco, CA (US); Theodore C. Sorom, San Francisco, CA (US); James R. Groves, San Francisco, CA (US)

(73) Assignee: Mantle Inc., San Francisco, CA (US)

( * ) Notice: Subject to any disclaimer, the term of this patent is extended or adjusted under 35 U.S.C. 154(b) by 58 days.

(21) Appl. No.: 16/102,422

(22) Filed: Aug. 13, 2018

(65) Prior Publication Data
US 2018/0345367 A1 Dec. 6, 2018

Related U.S. Application Data

(63) Continuation of application No. 15/705,548, filed on Sep. 15, 2017, now abandoned.

(60) Provisional application No. 62/407,318, filed on Oct. 12, 2016, provisional application No. 62/395,289, filed on Sep. 15, 2016.

(51) Int. Cl.
| | |
|---|---|
| *B22F 3/00* | (2006.01) |
| *B33Y 10/00* | (2015.01) |
| *B33Y 30/00* | (2015.01) |
| *B33Y 50/02* | (2015.01) |
| *B29C 64/393* | (2017.01) |
| *B29C 64/106* | (2017.01) |
| *B22F 3/10* | (2006.01) |

(Continued)

(52) U.S. Cl.
CPC ............ *B22F 3/008* (2013.01); *B29C 64/106* (2017.08); *B29C 64/393* (2017.08); *B33Y 10/00* (2014.12); *B33Y 30/00* (2014.12); *B33Y 50/02* (2014.12); *B22F 3/10* (2013.01); *B22F 2202/05* (2013.01); *B22F 2301/35* (2013.01); *B22F 2998/10* (2013.01); *B22F 2999/00* (2013.01); *B29K 2101/10* (2013.01); *B29K 2505/00* (2013.01)

(58) Field of Classification Search
CPC ................................. B33Y 10/00; B22F 3/008
USPC ............................................................. 419/6
See application file for complete search history.

(56) References Cited

U.S. PATENT DOCUMENTS

| | | | |
|---|---|---|---|
| 4,552,719 A | 11/1985 | Morimoto et al. | |
| 4,596,746 A * | 6/1986 | Morishita | B22F 1/0014 419/23 |

(Continued)

FOREIGN PATENT DOCUMENTS

| | | |
|---|---|---|
| EP | 2443640 B1 | 10/2014 |
| EP | 2902427 A1 | 8/2015 |

(Continued)

OTHER PUBLICATIONS

Ader C et al., Research on Layer Manufacturing Techniques at Fraunhofer, Fraunhofer Institute for Laser Technology ILT, Aachen, Germany, pp. 26-37, Aug. 4, 2004.

*Primary Examiner* — Weiping Zhu
(74) *Attorney, Agent, or Firm* — Jeffrey Schox; Diana Lin

(57) ABSTRACT

A system for additive metal manufacturing, including a deposition mechanism, a translation mechanism mounting the deposition mechanism to the working volume, and a stage. A method for additive metal manufacturing including: selectively depositing a material carrier within the working volume; removing an additive from the material carrier; and treating the resultant material.

8 Claims, 11 Drawing Sheets

(51) Int. Cl.
  *B29K 101/10* (2006.01)
  *B29K 505/00* (2006.01)

(56) References Cited

U.S. PATENT DOCUMENTS

| | | |
|---|---|---|
| 5,732,323 A | 3/1998 | Nyrhilae |
| 6,207,300 B1 | 3/2001 | Koch et al. |
| 6,602,766 B2 | 8/2003 | Chang et al. |
| 6,630,009 B2 | 10/2003 | Moussa et al. |
| 6,974,656 B2 | 12/2005 | Hinczewski |
| 7,070,734 B2 | 7/2006 | Liu et al. |
| 8,361,924 B2 | 1/2013 | Tanaka et al. |
| 9,153,355 B2 | 10/2015 | Choi et al. |
| 9,190,187 B2 | 11/2015 | Song et al. |
| 2002/0072205 A1 | 6/2002 | Chang et al. |
| 2002/0129485 A1* | 9/2002 | Mok ................. G05B 19/4099 29/527.2 |
| 2002/0176793 A1 | 11/2002 | Moussa et al. |
| 2003/0175621 A1 | 9/2003 | Hinczewski |
| 2006/0083652 A1 | 4/2006 | Liu et al. |
| 2012/0046164 A1 | 2/2012 | Tanaka et al. |
| 2013/0134363 A1 | 5/2013 | Song et al. |
| 2013/0139873 A1 | 6/2013 | Choi et al. |
| 2014/0060633 A1 | 3/2014 | Lucas et al. |
| 2014/0287583 A1 | 9/2014 | Liu et al. |
| 2014/0291886 A1* | 10/2014 | Mark ...................... B29C 48/92 264/163 |
| 2014/0295199 A1 | 10/2014 | Baarman et al. |
| 2015/0061170 A1 | 3/2015 | Engel et al. |
| 2015/0076739 A1 | 3/2015 | Batchelder |
| 2015/0080495 A1 | 3/2015 | Heikkila |
| 2017/0087632 A1 | 3/2017 | Mark |
| 2017/0209958 A1 | 7/2017 | Soshi |

FOREIGN PATENT DOCUMENTS

| | | |
|---|---|---|
| EP | 3064556 | 9/2016 |
| WO | 200039358 | 7/2000 |
| WO | 2003084708 | 10/2003 |

* cited by examiner

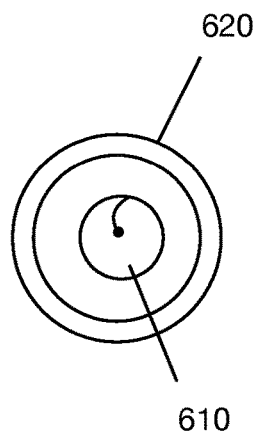
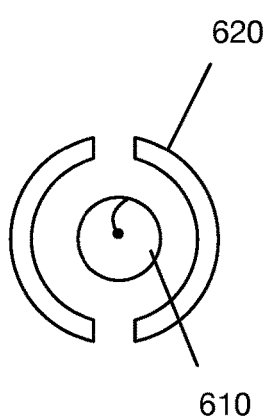
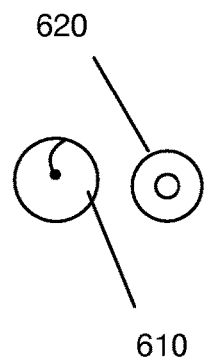
FIGURE 3A　　　　　　FIGURE 3B　　　　　　FIGURE 4
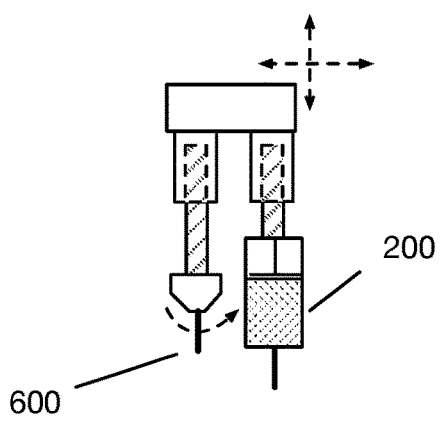
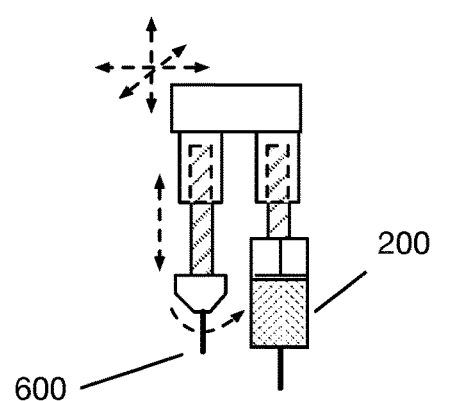
FIGURE 5　　　　　　　　　　　FIGURE 6

SYSTEM AND METHOD FOR ADDITIVE METAL MANUFACTURING

CROSS-REFERENCE TO RELATED APPLICATIONS

This application is a continuation of prior U.S. application Ser. No. 15/705,548 filed 15 Sep. 2017, which claims the benefit of U.S. Provisional Application No. 62/395,289 filed 15 Sep. 2016 and U.S. Provisional Application No. 62/407,318 filed 12 Oct. 2016, all of which are incorporated in their entireties by this reference. This application is related to U.S. application Ser. No. 15/594,472 filed 12 May 2017, which claims the benefit of U.S. Provisional Application No. 62/335,679 filed 13 May 2016 and U.S. Provisional Application No. 62/421,707 filed 14 Nov. 2016, all of which are incorporated in their entireties by this reference.

TECHNICAL FIELD

This invention relates generally to the additive manufacturing field, and more specifically to a new and useful metal manufacturing system and method in the additive manufacturing field.

BRIEF DESCRIPTION OF THE FIGURES

FIGS. 3A, 3B, and 4 are examples of vacuum shrouds that can be used.

FIGS. 5 and 6 are examples of the relationship between the stage translation axes and mechanism translation axes.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
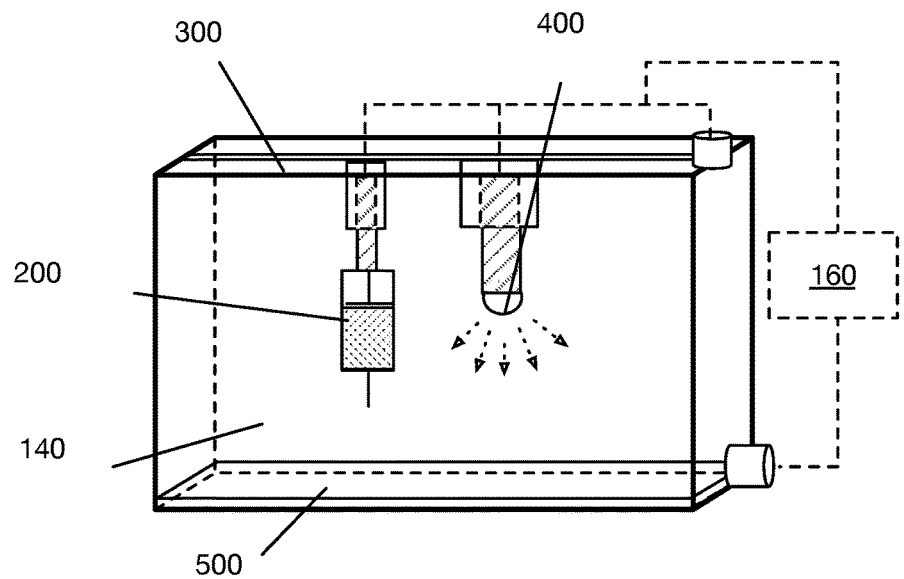
FIG. 1 is a schematic representation of a variation of the system.

As shown in FIG. 1, the system for additive metal manufacturing includes: a deposition mechanism, a translation mechanism mounting the deposition mechanism, and a stage. The system can optionally include a material manipulation mechanism, an additive removal mechanism, a sintering mechanism, a treatment mechanism, sensors, a stage, a working volume, a control system, and/or a power system.

Figure 10:
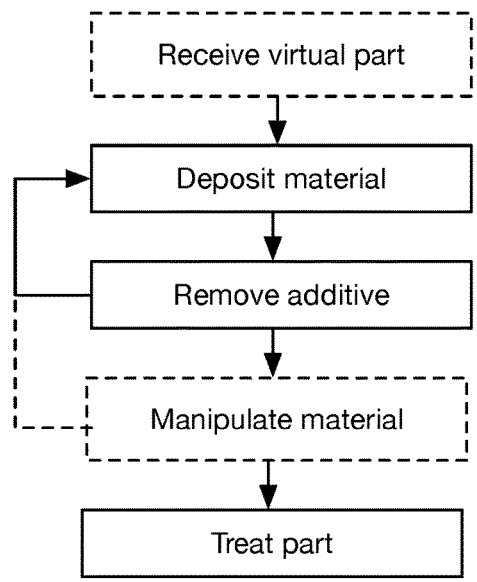
FIG. 10 is a flowchart representation of the method.

As shown in FIG. 10, the method for additive metal manufacturing includes: selectively depositing a material carrier in a predetermined location within the working volume; removing an additive from the material carrier; and treating the resultant material. The method can optionally include manipulating the material; and monitoring the additive manufacturing process and dynamically adjusting the additive manufacturing parameters based on process monitoring.

The system and/or method function to enable metal piece manufacture through layerwise material processing.

2. Benefits

The system and/or method can confer several benefits over conventional systems.

First, in some variants, the method can reduce overall part distortion by removing additives from the material carrier between deposition steps. For example, in variants where the material carrier (e.g., build material) includes a metal paste, the method can remove the solvent from the paste layers after a predetermined number of paste layers have been deposited (e.g., after each layer 10 has been deposited). This can further decrease the overall part manufacturing time, since solvent can be removed from a thin layer of paste faster than it can be removed from the entirety of a wet workpiece. In another example, variants of the method can use material carriers that do not require debinding (e.g., a binderless build material), which can decrease the geometry change between initial printing and the final part.

Second, in some variants, the method can improve part resolution and/or surface finish by leveraging a hybrid manufacturing technique. The hybrid manufacturing technique can include manipulating (e.g., machining, forming, etc.) the material carrier, a part precursor (e.g., green body or brown part), and/or the material before the piece is finalized (e.g., before the final geometry is formed, before the piece is treated, etc.). For example, each material layer 10 can be machined after it is deposited. Manipulating the material prior to treatment can function to reduce the amount of manipulation force required to create a desired geometry, to control inter-layer interfaces (e.g., level the layer 10 before subsequent layer deposition), to shape surfaces that are enclosed or rendered inaccessible by subsequent layers (e.g., finish interior surfaces), or confer any other suitable set of benefits.

Third, some variants of the method can achieve improved part resolution and/or surface finish by creating a green body with near-net geometry (e.g., a near-net part precursor), then controlling or minimizing the geometry change during green body processing into the end product. For example, method variants can create near-net part precursors using a build material that has less than a threshold shrinkage between the green body and the final part (e.g., less than 30%, 20%, 10%, 5%, 8-12%, or any other suitable percentage volumetric or linear dimensional change with 1%, 0.1%, 0.01%, or any other suitable precision), by using hybrid manufacturing techniques, by using a combination of the above, or otherwise creating the near-net part precursor. In a specific example, the method can use a binderless paste (e.g., a paste with less than a threshold percentage of binder, paste with no binders) as the build material, or use a paste with additives that can be removed (e.g., evaporated, burned off) between deposition steps.

Fourth, the inventors have discovered that conventional cooling techniques for machined parts (e.g., spraying coolant onto the workpiece) can result in undesirable part deformation in some variants of the method, such as when the layers form soft solids are used in hybrid manufacturing systems. Soft solids can be soft solids deformable parts, parts with low rigidity, or otherwise defined. In these variants, the inventors have discovered that not cooling the machining tool, or using less forceful cooling techniques (e.g., convection, conduction, etc.), can provide sufficient cooling. In other variants, the inventors have discovered that it can be desirable to maintain the temperature of the: printed layer, machine tool, local build volume (e.g., local the layer, local the machined layer portion), entire build volume, or other region at the uncooled tool operating temperature. This variant can result in tighter tolerances, since all components (e.g., the workpiece and the tool) are maximally thermally expanded at the uncooled tool operating temperature throughout the deposition and manipulation processes (e.g., the components do not breathe throughout the processes). In this variant, the waste heat from the layer machining can optionally be recycled to passively heat the local build volume and remove the build material additive and/or cure the build material layer, or otherwise used.

Fifth, the inventors have discovered that conventional fixturing techniques for machining, such as soft jaw fixturing, can be difficult to use or result in undesirable part deformation when soft solids are processed using hybrid manufacturing systems. The inventors have further discovered that fixing the part precursor to the build plate using adhesives, magnetic attraction, a combination of the above, and/or other retention mechanisms can individually or cooperatively provide sufficient retention forces during machining to resist or overcome the shear forces applied by the machining tool to the part precursor during material manipulation.

3. System

As shown in FIG. 1, the system 100 for additive metal manufacturing includes: a deposition mechanism 200, a translation mechanism 300 mounting the deposition mechanism 200 to the working volume 140, and a stage 500. The system 100 can optionally include a workpiece retention mechanism 510, an additive removal mechanism 400, a material manipulation mechanism 600, a treatment mechanism 800, sensors 120, a control system 160, and/or a power system. The system 100 functions to print metal layers within the working volume, print support layers within the working volume, remove additives from the material carrier, treat the resultant part precursor, and/or perform any other suitable functionality.

A variation of the system 100 includes a working volume; a translation mechanism arranged within the working volume 140 and actuatably mounting a deposition mechanism (e.g., extrusion head), a material manipulation mechanism (e.g., a machining cutting tool), and an additive removal mechanism operable between a drying mode and a sintering mode (e.g., a heating element with an environment control mechanism); a stage opposing the translation mechanism 300 in the working volume; a control system 160 controlling translation mechanism, deposition mechanism, material manipulation, and additive removal mechanism operation; and an annealing mechanism separate from and fluidly connected to the working volume. The deposition mechanism, a material manipulation mechanism, and an additive removal mechanism preferably have a fixed relative position along a first and second axis (e.g., x and y axes), and actuate relative to each other along a third axis (e.g., z axis), but can be otherwise positionally related.

All or a subset of the system components can be removably coupled to the system housing, which can confer system flexibility and reconfigurability. The system components can be removable, hot-swappable (e.g., replaceable during system operation), or otherwise coupled to the system 100. The system components can be manually replaced, automatically replaced (e.g., by a replacement system including an actuator and a set of sensors 120 configured to monitor consumable component wear, position, etc.), or otherwise replaced. In one variation, the deposition mechanism 200 (or a component thereof, such as the material storage) can be replaceable during system operation, wherein the system 100 can automatically connect a new material cartridge to the deposition head 210 in response to the fill level in a preceding cartridge falling below a threshold level. In a second variation, the tool holder can automatically release and pick up a new tool (e.g., from a tool repository mounted to the working volume). However, consumable system components (e.g., deposition mechanisms, additive removal systems, etc.) or any other suitable component can be statically mounted to the system 100 or otherwise coupled to the system 100.

The system 100 preferably deposits material layers between 5 μm and 250 μm thick, but can alternatively deposit layers having any other suitable thickness. The system 100 preferably deposits material lines that are between 50-500 μm wide, but can alternatively deposit material lines between 0.5-5 mm wide or having any other suitable width. The material deposition speed is preferably between 10-500 mm/s, but can alternatively be slower or faster. The system 100 is preferably capable of building geometries with overhangs and other complex geometries for small feature sizes (e.g., less than 500 μm, less than 200 μm, etc.), but can alternatively be capable of building geometries having any other suitable parameter values. The system 100 preferably has a positional resolution on the order of 100 μm, but can alternatively have higher or lower positional resolution.

The system 100 preferably deposits (e.g., prints) and manipulates a working material, which forms the final part geometry. The working material can be metal, ceramic, or be any other suitable material. The metal can include iron (e.g., be ferrous), steel, aluminum, nickel, titanium, or any other suitable metal. In one variation, the working material can include a scaffold material and an infiltrant material (e.g., form a self-infiltrated material). The working material can include nanoparticles, microparticles, chips, or have any other suitable size. The working material is preferably deposited as part of a working material carrier, but can alternatively be deposited as one of a set of deposition reagents (e.g., a carrier and curing agent pair), be deposited as a powder, or be deposited in any other suitable form factor.

Figure 14:
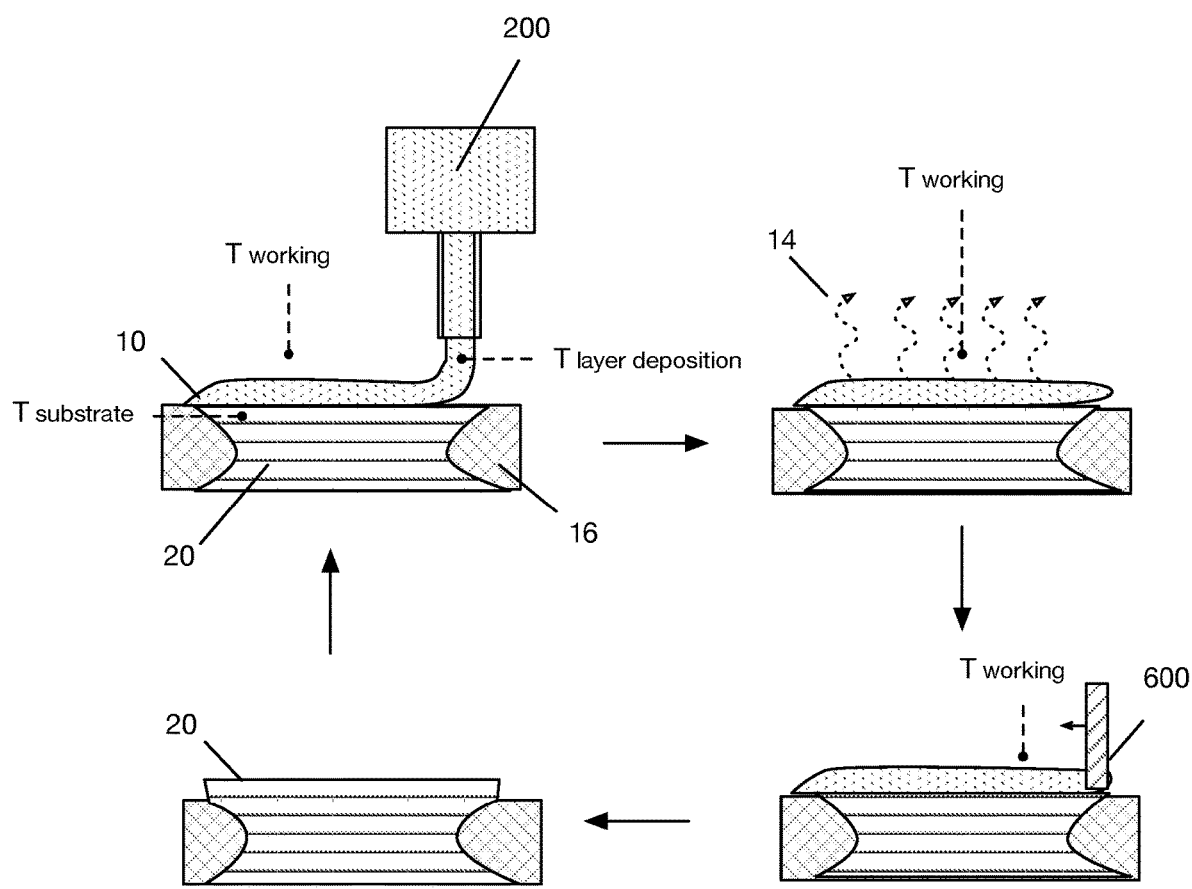
FIGS. 14, 15, and 16 are schematic representations of a first, second, and third specific example of the method, respectively.

The working material carrier 12 (build material) preferably includes the working material and one or more additives that adjusts the physical properties (e.g., handling properties) of the working material, but can include any suitable material. The material carrier 12 preferably creates a chipforming composite, but can alternatively form a composite with any other suitable set of properties. The material carrier 12 is preferably a paste (e.g., material particles suspended in a solvent, with or without binders), but can alternatively be a clay, metal matrix composite, metal foil, filament, an ink, aerosol, feedstock (e.g., material particles with a binder, etc.), or have any other suitable form factor. The paste can have a low viscosity that enables the deposited paste layer to fill in cracks, pores, or other imperfections in the previously-deposited layer (e.g., prior layer, previous layer, preceding layer, adjacent layer, etc.), or can have any other suitable characteristic. The binder can include one or more of a: polymer (e.g., thermoset plastics, thermoplastic, epoxy, etc.), plastic, ceramic, liquid, wax, or be any other suitable binder. In one variation, the material carrier 12 can include one or more materials disclosed in U.S. application Ser. No. 15/594,472, incorporated herein in its entirety by this reference. In a second variation, the material carrier 12 can include a binderless paste that includes material particles suspended in a solvent, without a polymer binder or with less than a threshold percentage of binder by weight, mass, or volume (e.g., less than 50%, 25%, 10%, or other percentage by volume; less than 8% 3%, 1%, or other percentage by mass, etc.). The solvent can be volatile within the working temperature range (e.g., have a boiling or sublimation point less than or equal to a temperature within the working temperature range; example shown in FIG. 14) or liquid at the working temperature range (e.g., wherein the deposited layer 10 can be subsequently heated or otherwise treated to remove the solvent). The solvent can be organic, inorganic, or have any other suitable property. Examples of the solvent include water, ethanol, propane, butane, acetone, propanol, hexanal, formaldehyde, plasticizers, or any other suitable solvent.

The system 100 can additionally deposit and manipulate a support material 16, which functions to support the working material during part manufacture (e.g., during part printing). The support material 16 can have a lower melting point or decomposition point than the working material, be more volatile than the working material, be more brittle than the working material, or have any other suitable physical properties relative to the working material. The support material 16 can include carbonaceous microparticles (e.g., graphite, carbon black), polymers (e.g., plastics, gels), carbon steel, ceramic, sand, carbon, silica, alumina, boron, or be any other suitable material. The support material 16 can be deposited as part of a support material carrier (e.g., paste), as powder, or in any other suitable form factor. The support material 16 can be used to support working material overhangs, form negatives for the working material (e.g., wherein the working material can fill in the negative, be heated to conform to the negative geometry, etc.), or be otherwise used. Alternatively, the viscosity of the working material carrier can be leveraged to create overhangs (e.g., of less than 40°, 35°, 70°, etc.).

The deposition mechanism 200 of the system 100 functions to deposit a predetermined volume of material in a predetermined location within the working volume. The material can include: the working material, the support material 16, metal, coatings, deposition reagents, treatment reagents, or be any other suitable material. The system 100 can include one or more deposition mechanisms. In a first variation, the system 100 includes a different deposition mechanism for each material type. In a second variation, the system 100 includes multiple deposition mechanisms for one material type (e.g., an array of deposition mechanisms, an array of deposition heads connected to a common material reservoir, etc.). In a third variation, the system 100 includes one deposition mechanism for multiple material types (e.g., both the working material and the support material 16 are deposited through the same head). When the system 100 includes multiple deposition mechanisms, the multiple deposition mechanisms can be statically connected, translate independently, statically connected along a first axis and independently actuatable along a second axis, or otherwise connected.

The deposition mechanism 200 can include a deposition head, material storage, and a deposition force mechanism. The deposition head 210 can include an extruder head, a print head, a needle, a spray nozzle (e.g., inkjet, electrostatic, etc.), or include any other suitable head. The extrusion aperture of the deposition head 210 can be symmetric (e.g., circular, ovular, etc.), asymmetric, or have any other suitable shape. In a specific example, the deposition head 210 includes a needle with an extrusion aperture having a diameter between 50-500 µm, but can alternatively have extrusion apertures with diameters between 5-250 µm or 0.5-5 mm, or any other suitable diameter. The deposition head 210 can be heated (e.g., to a material carrier melting point), unheated (e.g., not actively controlled, equilibrated to room temperature, etc.), cooled, or otherwise thermally managed. Each deposition mechanism can include one or more deposition heads of same or different type.

The material storage 18 can include: a material reservoir retaining a volume of the material (e.g., a canister) or material reagent, a reel or spool of the material, a cartridge or set thereof (e.g., with different material carrier components), or include any other suitable storage mechanism. The material storage can be made of glass, ceramic, metal, plastic, or any other suitable material. Each deposition mechanism can include one or more material storage components of same or different type, wherein multiple material storage components can be fluidly connected or isolated. The material storage can be statically mounted to the working volume 140 (e.g., top wall), translate with the deposition head 210 (e.g., be mounted to the same translation mechanism as the deposition mechanism); translate independently of the deposition head, or otherwise mounted. In one variation, the material storage 18 is connected to the deposition head 210 by a fluid manifold (e.g., a flexible tube, rigid tube, etc.), but can alternatively be directly fluidly connected to the head (example shown in FIG. 2; e.g., wherein the head is mounted to a sidewall of the material storage; wherein the material storage and head are a unitary piece, etc.). However, the material storage can be otherwise connected to the deposition head.

The deposition force mechanism functions to move the material from the material storage to the deposition head. The deposition force mechanism can be passive (e.g., driven by gravity, hydrostatic pressure, etc.), active (e.g., driven by a motor), or otherwise actuated. The deposition force mechanism can be a set of rollers (e.g., coupled to the head and configured to pull material from a reel into the extrusion head), a piston (e.g., driven pneumatically, hydraulically, etc.), an auger, or be any other suitable force-generation mechanism. The deposition force mechanism can be connected to the material storage, wherein the deposition force mechanism applies a deposition force (e.g., positive force) to the material within the material storage to force the material toward the deposition head. Alternatively, the deposition force mechanism can be connected to the deposition head, wherein the deposition force mechanism generates a suction force or feeding force to pull material from the material storage into the head. However, the deposition force mechanism can function in any other suitable manner.

The deposition mechanism 200 can optionally include a material conditioning mechanism that functions to condition the material carrier 12 before deposition (e.g., for deposition) and/or after deposition. Examples of conditioning the material carrier 12 includes: heating the material carrier 12

(e.g., melting, softening, etc.), reacting the material carrier 12 (e.g., with a light catalyst, etc.), mixing the material with a solvent, adding additives to the material, or otherwise conditioning the material. The material conditioning mechanism can be integrated into the deposition head, connected to the deposition head 210 (e.g., precede the deposition head 210 along the print direction, follow the deposition head 210 along the print direction, etc.), to the material storage, to the manifold, to the working volume, to the stage, or to any other suitable component. For example, a deposition head can selectively heat the binder to the binder melting point prior to layer deposition (when the material carrier 12 includes a binder). Examples of the material conditioning mechanism include: light emitting elements (e.g., lasers, UV light, IR light, etc.), heating elements (e.g., resistive heating elements, corona discharge elements, etc.), cooling elements (e.g., fans, Peltier coolers, etc.), nozzles, pressure-generation elements, mixing elements, or any other suitable material conditioning mechanism.

The translation mechanism 300 functions to mount and translate the deposition mechanism(s), or components thereof, within the working volume 140 along one or more axes. In one variation (example shown in FIG. 5), the translation mechanism 300 moves the deposition mechanism 200 along the x- and z-axes, while the stage 500 controls y-axis movement. In a second variation, the translation mechanism 200 moves the deposition mechanism 200 along the x- and y-axes, while the stage 500 controls z-axis movement (e.g., along the print direction). In a third variation (example shown in FIG. 6), the stage 500 is statically mounted to the working volume, and the translation mechanism 300 moves the deposition mechanisms and/or material manipulation mechanisms relative to the stage 500 (e.g., along 3 axes, 5 axes, etc.). This variant can be desirable when the workpieces are soft solids (e.g., have low stiffness, low durometer, etc.) or have high brittleness, as stage motion resulting in workpiece motion may deform the workpiece. However, the translation mechanism 300 can control movement along all axes, movement along a single axis, or control any other suitable translation. The translation system can include a tracking system (e.g., extending along the translation axis) and an actuator. The tracking system can include a rail system, set of tracks, a gantry system, or any other suitable system capable of directing deposition mechanism translation. The actuator can include a rack and pinion assembly, a screw assembly, a toothed belt assembly, an electric motor, a stepper motor, an electroactive polymer, or any other suitable actuator capable of controlling deposition mechanism translation along the tracking system. The system 100 can include a different translation mechanism for each axis, or include a single translation mechanism that controls translation along multiple axes. For example, the system 100 can include a first translation system including an actuator coupled to an overhead rail extending along the x-axis, and a second translation system including a second actuator coupled to each deposition mechanism that controls z-axis translation.

The stage 500 (e.g., build plate) functions to retain the part precursor (e.g., workpiece) during material deposition, additive removal, and/or part treatment. The layers are preferably deposited onto or over the stage, but can be otherwise deposited. The stage 500 is preferably arranged within the working volume, opposing the deposition mechanism(s) (e.g., underneath the deposition mechanism), but can alternatively be arranged in any other suitable location and position. The stage 500 is preferably removably mounted to the working volume 140 by clips, screws, tracks (e.g., a tongue-and-groove system), or any other suitable coupling mechanism, but can alternatively be substantially permanently mounted (e.g., built-in) to the working volume. The stage 500 can be made of metal (e.g., ferrous, nonferrous), ceramic, plastic, or any other suitable material. The stage 500 can additionally include heating elements, cooling elements, function as a thermal distribution mechanism, or include any other suitable component. The stage 500 is preferably planar, but can alternatively be curved (e.g., convex, concave, dimpled, etc.), or have any other suitable geometries or features. The stage 500 is preferably level (e.g., substantially perpendicular to a gravity vector), but can alternatively be tilted (e.g., wherein the system 100 determines the tilt angle(s) and transforms the printing coordinates to accommodate for the tilt) or otherwise oriented. In one variation of the latter variant, the layer can be deposited on a tilted stage, and be manipulated to be flat (e.g., relative to the: prior layer, stage plane, a working volume coordinate system, etc.). However, the layer can be otherwise planarized. The stage 500 can optionally include dampers (e.g., to absorb machining or printing vibrations), levelers, or any other suitable mechanism.

The stage 500 can additionally translate the part precursor relative to the deposition mechanism(s). The stage 500 can translate and/or rotate along the x-axis, y-axis, z-axis, and/or any other suitable axis, or be static relative to the working volume. The stage 500 can be mounted to or include actuation mechanisms, such as gantries, linear motors, rotary motors, or other actuation mechanisms that control the stage 500 motion. However, the stage 500 can actuate in any other suitable manner, and include any other suitable actuation mechanism.

The stage 500 position and/or workpiece position on the stage 500 can be monitored and stored (e.g., registered) to track workpiece location through one or more working volumes or through different manufacturing stages. The stage 500 position and/or workpiece position can be tracked: optically, using the stage 500 translation encoders, using probe outputs, or otherwise tracked. Differences between actual and expected positions can be accommodated by: adjusting the working coordinates, adjusting the physical position of the stage 500 or workpiece, or otherwise accommodating the difference. The workpiece 20 can additionally or alternatively be assigned an identifier, such that the workpiece 20 can be identified and tracked through the different manufacturing stages. The workpiece identifier can be a stage identifier, a workpiece surface pattern (e.g., pattern of scratches, etc.), an identifier printed or machined into the workpiece, or be any other suitable identifier.

Figure 7:
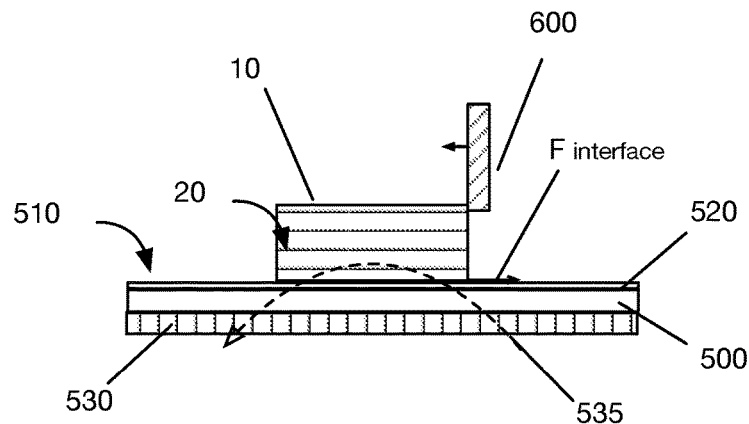
FIG. 7 is an example of a workpiece retention mechanism.

The system 100 can optionally include a workpiece retention mechanism that functions to retain the workpiece 20 against the build plate and/or support the workpiece 20 during the material manipulation process, build plate movement, and/or during any other suitable process. For example, the retention mechanism(s) can prevent the workpiece 20 from shearing off the build plate while the workpiece 20 is being machined, wherein the translational rupture strength (and/or retention force) generated by the retention mechanism(s) matches or exceeds the machining strength, shear force generated by the machining tool, torsion generated by the machining tool, or other machining force applied to the workpiece. In a first variation, the retention mechanism 510 can apply a substantially constant force during the additive 14 manufacturing process. In a second variation, the retention mechanism 510 can be selectively operated to apply a retention force (e.g., attractive magnetic force) during certain processes (e.g., workpiece machining) and not others (e.g., material deposition). One or more retention mechanisms can be concurrently used to retain the workpiece 20 (example shown in FIG. 7).

In a variation wherein the workpiece 20 (or portion thereof) is magnetic (e.g., ferrous, graphite-based, etc.), the stage 500 can be magnetic or include a magnetic mechanism 530 (e.g., permanent magnet, electromagnet) that generates a magnetic retention force 535 (e.g., magnetic attraction force, repulsion force) that retains the workpiece 20 against the stage. The magnetic mechanism 530 can include: a permanent magnet array, an electromagnet array, or any other suitable magnetic array including one or more magnetic elements. The magnetic mechanism 530 can generate a uniform magnetic force across the build plate, a variable magnetic force across the build plate, or generate any other suitable force. The magnetic mechanism 530 can be arranged underneath the build plate (e.g., generate an attractive magnetic force), above the build plate (e.g., generate a repulsive magnetic force), to the side of the build plate (e.g., generate a magnetic force that resists a lateral manipulation force), or otherwise arranged.

In a second variation, the retention mechanism 510 includes adhesive. The adhesive is preferably arranged in an interface layer 520 over the build plate surface proximal the deposition mechanism 200 and/or material manipulation mechanism, but can be otherwise arranged. The adhesive can include: graphite, boronitride, titania, silica, or any other suitable adhesive. The interface layer 520 can additionally or alternatively include magnetic materials, reagents (e.g., that reacts with the material carrier), support material 16, or any other suitable material. However, the system 100 can include any other suitable retention mechanism.

In a third variation, the workpiece 20 can be retained on the stage 500 by a raft of support material 16, wherein the support material 16 can adhere to the stage. However, the workpiece 20 can be retained against the stage 500 by Van der Waals forces, hydrogen bonds, electrostatic bonds, ionic bonds, covalent bonds, fixtures (e.g., clamps, softjaws, etc.), or any other suitable retention force or mechanism.

The system 100 preferably defines a working volume 140 (e.g., build volume) that the part is built within. The working volume 140 can be defined by the volume accessible by the deposition mechanism 200 relative to the stage, the volume defined by system supports or system walls, or otherwise defined. The system 100 can be a desktop unit with a small footprint (e.g., 50 cm³ build volume), an industrial unit with a large footprint, or be any suitable size.

The working volume 140 can be open to the ambient environment, partially enclosed, fully enclosed, connected to the ambient environment by a manifold (e.g., inlet manifold, vent manifold), or otherwise fluidly connected to the ambient environment. The working volume 140 preferably defines a working volume lumen, which can be open, partially open, or entirely closed. The working volume 140 can be enclosed by a flexible skirt, a housing (e.g., thermally conductive, thermally insulative), or otherwise enclosed.

Properties of the working volume lumen are preferably actively controlled (e.g., by an environment control mechanism, such as a temperature control mechanism), but can alternatively be passively controlled, equilibrated with the ambient environment, or otherwise controlled. The environment control mechanism of the working volume 140 can be the sintering mechanism's environment control mechanism, be similar to one or more of the sintering mechanism's environment control mechanism described below, or be any other suitable environmental control mechanism Properties that can be controlled include the working volume: temperature, pressure, composition (e.g., nitrogen, oxygen, particulate, volatile or other composition's percentage, ppm, or other measurement, etc.), or other property. The property's average, mean, gradient, distribution, or other value for: the entire working volume, a localized print area (e.g., within a threshold distance of the workpiece, the layer, or other workpiece portion; a volume surrounding the workpiece 20 or region thereof), a region adjacent the layer 10 (e.g., proximal a manipulated portion of the layer, a layer 10 region distal the manipulated portion of the layer, an un-manipulated portion of the layer, etc.), or any working volume voxel or region can be monitored and/or controlled. The working volume 140 or portions thereof can be actively monitored (e.g., using sensors 120 connected to or directed toward the working volume 140) and/or dynamically adjusted (e.g., by a control system 160 connected to the sensors 120), passively monitored (e.g., inferred from tool signals, part deformation parameters, etc.), or otherwise monitored. The properties can be controlled during layer deposition, after the layer 10 has dried or cured, during material manipulation, after material manipulation, after layer deposition until material manipulation (e.g., including or excluding material manipulation), throughout the entire process, or controlled for any other suitable process or method stage.

In one variation, the system 100 can include a temperature control mechanism that functions to control the localized or overall working volume temperature. The temperature control mechanism can be arranged within the working volume, thermally connected to the working volume lumen, or otherwise arranged relative to the working volume. In a first embodiment, the temperature control mechanism controls the workpiece temperature. In the first embodiment, temperature control mechanism preferably maintains the layers of the workpiece 20 at a substantially uniform working temperature (e.g., within 5 degrees C., within 0.5 degrees C., within 0.005 degrees C. variance, less than a threshold temperature gradient, etc.) or within a working temperature range, but can alternatively maintain portions of a single layer 10 at a substantially uniform working temperature (e.g., wherein other layers can have different temperatures) or working temperature range, maintain the layers of the workpiece 20 at different temperatures, maintain different sections of the workpiece 20 at different temperatures, or create any other suitable temperature distribution over the workpiece. The workpiece temperature can be maintained at a temperature that is the same as, higher than, or less than the working volume temperature. In a second embodiment, the temperature control mechanism maintains the entire working volume lumen at the substantially uniform working temperature (e.g., within 5 degrees C. variance), but can alternatively maintain different portions of the working volume lumen at different temperatures. However, the temperature control mechanism can control the temperature of any other suitable portion of the working volume.

The working temperature or working temperature range can be: less than or within a temperature range of the material carrier deposition temperature (e.g., within ±5° C., ±10° C., etc.); less than or within a temperature range of an uncooled manipulation tool operating temperature (e.g., the uncooled manipulation tool's temperature when manipulating the workpiece); at, above, below, or within a temperature range of the material carrier additive's phase transition point (e.g., evaporation point, normal boiling point, sublimation point, melting point, setting point, etc.); at or below a previous layer temperature; at or below: 100° C., 65° C., or any other suitable temperature; between 45° C. to 65° C.;

between 30° C. to 40° C.; at, above, or below room temperature; and/or any other suitable temperature. Additionally or alternatively, the duration that the working volume region is held at a given temperature and/or duration between successive manufacturing processes, such as the duration between successive layer deposition) can be dynamically adjusted to ensure that a threshold amount of the additive is removed. In one example, the working volume 140 is held at the uncooled manipulation tool's operating temperature throughout the process, wherein the material carrier additive's boiling point is lower than said operating temperature. In a specific example, the additive's boiling point is below 150° C., wherein maintaining the working volume 140 at or around 100° C. evaporates the additive from the layer. In another example, the heat from the working volume and/or previous layer evaporates the additive from the deposited layer (e.g., wherein the deposited layer's deposition temperature can be lower than, equal to, or higher than the working temperature, such as room temperature). In another example, the working volume temperature is uncontrolled, wherein the waste heat from the manipulation tool heats the working volume. In another example, the working volume temperature is held at, above, or below the material carrier's setting point or melting point.

The temperature control mechanism can include a heated stage, a heating element (e.g., heat lamp, resistive heaters, exothermic reactions, etc.) arranged above and directed toward the workpiece 20 or stage 500 (e.g., mounted to the deposition mechanism 200 translation mechanism, a separate translation mechanism, the working volume 140 interior, etc.), a lumen heating system (e.g., heaters arranged along the walls of the working volume, a convection heating system, etc.), a cooling system (e.g., convection system, piezoelectric cooling system, fluid cooling system, etc.), the material manipulation mechanism 600 (e.g., through waste heat generated by material manipulation mechanism operation), a combination of the above, or any other suitable temperature control system 160.

In a second variation, the system 100 can include a lumen quality control mechanism that functions to control the gaseous composition of the working volume lumen. In a first embodiment, the lumen quality control mechanism includes a vacuum shroud that removes gas, particulates, and/or material chips from the lumen. In one example, the vacuum shroud 620 can provide a negative pressure that is strong enough to remove volatiles and particulates (e.g., smaller than a threshold size) from the lumen, but weak enough to leave chips (e.g., larger than a threshold size) from the lumen. The threshold size can be 1 micron, 10 microns, 1 millimeter, 1 centimeter, or be any other suitable size.

The vacuum shroud 620 is preferably arranged proximal to, and is more preferably aimed toward, the material manipulation mechanism, active region thereof, or manipulated layer, but can be otherwise oriented. The vacuum shroud 620 can be concentrically arranged about (e.g., encircle) the material manipulation mechanism 600 (e.g., tool head), be offset from the material manipulation mechanism 600 (e.g., next to the head, example shown in FIG. 4), or otherwise arranged. The vacuum shroud 620 can have an annular geometry (example shown in FIG. 3A), segmented annular geometry (example shown in FIG. 3B), be a tube, or have any other suitable geometry. However, the vacuum can alternatively be arranged along a working volume wall (e.g., fluidly connected to the lumen) or otherwise arranged. The vacuum shroud 620 is preferably fluidly connected to fluid manifold, wherein the fluid manifold can be fluidly connected to the ambient environment, the lumen (e.g., wherein the removed gas is recycled into the lumen), or to any other suitable endpoint. The fluid manifold can optionally include a filter, dessicant, catalyst, expansion chamber, magnetic particle collector, chip conveyer system, selective membrane, condenser, or other regeneration mechanism that preferentially removes particulates, volatiles, fluid, or other contaminants from the vacuumed fluid. In a specific example, the system can include a magnetic element, generating an attractive and/or repulsive magnetic force, that is arranged along the fluid manifold upstream of a filter, wherein the magnetic element can extract ferrous particulates (e.g., material particulates) from the fluid stream before fluid filtration with the filter.

In a second embodiment, the lumen quality control mechanism can be similar to the environment control mechanism of the sintering mechanism, and flood or selectively inject different gaseous compounds into the working volume 140 to control the lumen atmosphere. In a third embodiment, the system 100 can include a pressure control mechanism that controls the lumen pressure. The pressure control mechanism can include a pump, vacuum, or any other suitable fluid manipulation mechanism. In a third embodiment, the lumen quality control mechanism can be the chip clearing system. However, the system 100 can include any suitable environment control mechanism for the working volume.

The system 100 can optionally include an additive removal mechanism, which functions to remove additives from the deposited working material (e.g., paste). This can function to transform the part layer 10 or partially-printed part into a green body (e.g., by removing the solvent) or a brown part (e.g., by removing the binder). The additive removal mechanism 400 is preferably controlled by the control system 160 (e.g., that regulates power provided to the additive removal mechanism), but can be otherwise controlled. The additive removal mechanism 400 can be operable between a set of operation modes, each with its own set of target removal parameter values. For example, the additive removal mechanism 400 can be operated between a drying, curing, or hardening mode (e.g., with a target temperature of 150-300 C) and a sintering mode (e.g., with a target temperature of less than 800 C, or 922 C to 1384 C, etc.), or any other suitable set of modes. The additive removal mechanism 400 can be arranged within the working volume, be external and selectively fluidly connectable to the working volume 140 (e.g., above, below, adjacent to, or entirely separate from the working volume), or be otherwise related to the working volume.

The additive removal mechanism 400 can be a thermal mechanism, an electromagnetic mechanism (e.g., light system), a chemical reaction mechanism (e.g., wherein a gas or liquid reagent can be applied to the material layer 10 to bind, react with, or otherwise remove the additive), vibration mechanism (e.g., to remove bubbles or particulates with different sizes or densities), or any other suitable mechanism that removes the additive 14 in any other suitable manner. Example thermal mechanisms that can be used can include: a convection system including a heating element and a convection element (e.g., a fan, blower, etc.), a resistive heating system (e.g., a heated wire), an inductive heating system (e.g., that applies electromagnetic eddy currents to the target layer 10 region), an electromagnetic heating system (e.g., microwave heating system), IR system (e.g., a radiative heating lamp), waste heat from system components (e.g., the material manipulation mechanism, the control system 160, etc.), heat from preceding print jobs (e.g., from the prior part's sintering process), or any other suitable thermal mechanism. In a specific example, a light mechanism is configured to heat the material layers to 150-350 C to remove solvents within the material carrier. The light mechanism can emit beam-shaped (e.g., collimated) or diffuse light of one or more wavelengths (e.g., IR, UV, white light, etc.), and can include one or more light-emitting elements (e.g., LEDs, halogen lights, arc lamps, tungsten lights, lasers, etc.), filters or coatings, lenses, or any other suitable light-parameter adjusting mechanism.

The system 100 can include one or more additive removal mechanisms of the same or different type. For example, the system 100 can include a single solvent removal mechanism configured to remove solvent from the metal paste and the support material paste. The additive removal mechanism 400 can be statically mounted to the working volume, translate with the deposition mechanism 200 (e.g., be mounted to the same translation mechanism as the deposition mechanism; example shown in FIG. 2), translate independent from the deposition mechanism 200 (e.g., be mounted to a second, independent translation mechanism), or be mounted in any other suitable manner.

The system 100 can optionally include a material manipulation mechanism that functions to shape one or more material layers. In particular, the material manipulation mechanism 600 can refine part geometries (e.g., control part tolerances, define sharp features, shape interior corners, etc.), control layer 10 surface features (e.g., planarity, create inter-layer interface features), blend the interface between adjacent layers, or otherwise shape the material layers. The material manipulation mechanism 600 preferably selectively manipulates a portion of the deposited layer(s), and can shape the layer sides, layer broad face (e.g., surface), layer 10 corners, or any other suitable layer portion. The material manipulation mechanism 600 is preferably controlled by the control system 160 (e.g., based on a virtual part model), but can be otherwise controlled. The system 100 can include one or more material manipulation mechanisms of same or different type. For example, a first material manipulation mechanism can be used for the working material, while a second, different material manipulation mechanism can be used for the support material 16.

The material manipulation mechanism 600 can be selectively selected and/or controlled (e.g., by the control system 160) based on the material carrier 12 composition, the geometry to be formed (e.g., tolerances, features), the layer 10 dimensions (e.g., thickness, width, length), layer temperature, layer rheology or deformability, or any other suitable variable. For example, the head speed can be higher (e.g., between 50,000-100,000 rpm) when the material carrier 12 is a binderless paste, and be lower (e.g., less than 50,000 rpm) for a paste with a polymeric binder. However, the material manipulation mechanism 600 can be otherwise controlled.

The material manipulation mechanism 600 is preferably arranged within the working volume, but can alternatively be arranged outside of the working volume, be separate from the working volume, or be otherwise related to the working volume. The material manipulation mechanism 600 can be statically mounted to the working volume, translate with the deposition mechanism 200 (e.g., be mounted to the same translation mechanism as the deposition mechanism), translate independent from the deposition mechanism 200 (e.g., be mounted to a second, independent translation mechanism), or be mounted in any other suitable manner. For example, the material manipulation mechanism 600 can be mounted to the same translation mechanism as the deposition mechanism, and can actuate relative to the deposition mechanism 200 (e.g., translate along a machining axis, such as a z-axis) or be statically mounted relative to the deposition mechanism 200 (example shown in FIG. 5; e.g., extend beyond the deposition mechanism 200 along the deposition and/or machining axis, be shorter than the deposition mechanism 200 along the deposition and/or machining axis, etc.). The axial, rotational, angular, and/or other position of the material manipulation mechanism 600 relative to the deposition mechanism 200 (e.g., deposition head) is preferably known and accounted for through coordinate transformations or position calibration (e.g., using a probe or reference point 601), but can alternatively be unknown or otherwise managed.

The material manipulation mechanism 600 can include: material removal mechanisms (e.g., subtractive manufacturing mechanisms or heads), material deformation systems, lithography systems, or any other suitable system. Material removal mechanisms that can be used include: a cutting tool, such as linear cutting tools (e.g., tool bits, broaches), or rotary cutting tools (e.g., drill bits, countersinks, counterbores, taps, dies, milling cutters, reamers, cold way blades; example shown in FIG. 2); mechanical abrasion systems; laser ablation systems; electromagnetic cutting systems; plasma cutting systems; fluid cutting systems (e.g., using directed pressurized fluid, such as air or liquid, with or without particulates, such as diamond); cavitation systems; gas generation systems; impact systems (e.g., chipping systems); or any other suitable material removal mechanism. The cutting tool can be retained by a single-tool holder, a multi-tool holder (e.g., with a tool changer, for soft tooling), or otherwise retained. Material deformation systems that can be used include: flexible blades (e.g., painting knives), directed pressurized fluid (e.g., gas, liquid, etc.), or any other suitable material deformation system. The material manipulation mechanism 600 can double as the additive removal mechanism, wherein the material manipulation mechanism 600 can be operated in a first mode (e.g., low-power mode) to function as the additive removal mechanism, and operated in a second mode (e.g., a high power mode) to function as the material manipulation mechanism. Alternatively, the material manipulation mechanism 600 can be separate from the additive removal mechanism 400. However, the system 100 can include any number of any other suitable material manipulation mechanisms.

The material manipulation mechanism 600 can optionally include a chip clearing system that functions to remove material chips (e.g., material removed from the workpiece) from the workpiece 20 and/or stage. The chip clearing system can include: positive pressure systems configured to direct pressurized fluid (e.g., coolant, water, air) toward the workpiece 20 (e.g., perpendicular the stage, parallel the stage, at an angle to the stage, etc.); negative pressure systems configured to suck chips away from the workpiece 20 (e.g., arranged proximal the material removal mechanism, arranged proximal the manipulated portion of the workpiece, etc.); electromagnetic system (e.g., configured to generate a magnetic attractive force that attracts the chips); the lumen quality control mechanism; or include any other suitable chip clearing system. Alternatively, the material manipulation mechanism 600 can double as the chip clearing system, wherein the removed material can preferentially adhere to the material manipulation mechanism 600 instead of the workpiece 20. However, the system 100 can include any other suitable chip clearing system.

The system 100 can optionally include a sintering mechanism that functions to sinter the dried material layer. The material layer(s) can be sintered between layer deposition processes, after the workpiece 20 is completely printed (e.g., after an object precursor with geometry approximating a virtual part model is formed), during layer deposition, during layer manipulation, or at any suitable time. In one variation, the additive removal mechanism 400 can double as the sintering mechanism, such that the part is printed, optionally manipulated, and sintered in the same working volume (e.g., in-situ). In a second variation, the sintering mechanism 700 can be a different mechanism from the additive removal mechanism 400 (e.g., a separate and distinct volume). The sintering mechanism 700 is preferably controlled by the control system 160 based on the measured workpiece temperature, but can be otherwise controlled. The system 100 can include one or more sintering mechanisms of same or different type (e.g., one for the working material, one for the support material 16). The sintering mechanisms can be statically mounted to the working volume, translate with the deposition mechanism 200 (e.g., be mounted to the same translation mechanism as the deposition mechanism), translate independent from the deposition mechanism 200 (e.g., be mounted to a second, independent translation mechanism), or be mounted in any other suitable manner.

Figure 9:
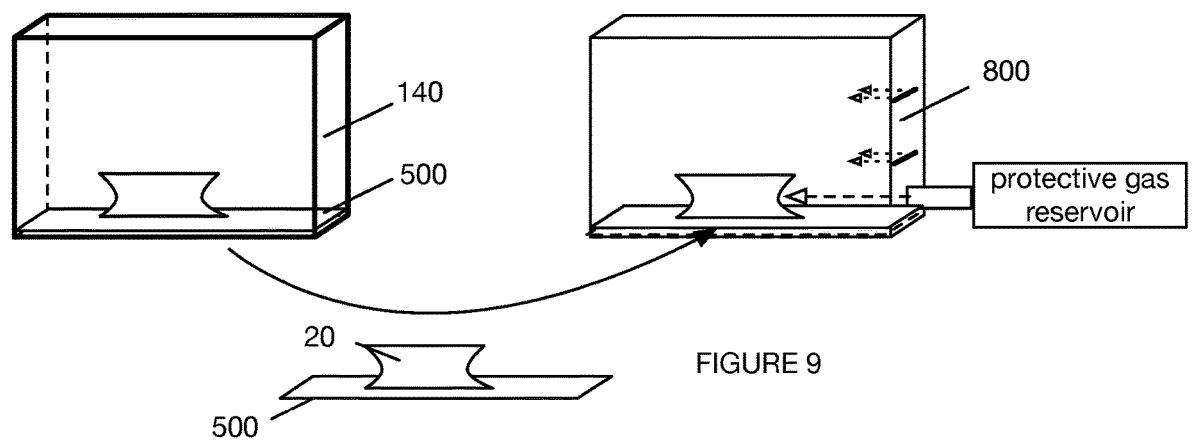
FIG. 9 is a schematic representation of an example of transferring the workpiece from the working volume to the treatment volume.

The sintering mechanism 700 can be a thermal mechanism (similar or different from the additive removal mechanism 400 thermal mechanisms), a pressure-generation element (e.g., piston, pressurized chamber, etc.), a laser system, or any other suitable sintering mechanism. The thermal mechanism is preferably configured to heat the workpiece 20 or material layer 10 to 500-800° C., but can alternatively heat the workpiece 20 or material layer 10 to 400-1000° C., or to any other suitable range. In a first variation, the sintering mechanism 700 can be a set of heating elements mounted to the working volume. In a second variation, the sintering mechanism 700 can be a heating chamber (e.g., furnace) adjacent and selectively fluidly connected to the working volume, wherein the stage 500 can be moved (e.g., automatically, using a translation mechanism; manually, etc.) into the heating chamber. In a third variation, the sintering mechanism 700 can be a separate heating chamber from the working volume, wherein the stage, supporting the workpiece, is removed from the working volume 140 and inserted into the heating chamber (example shown in FIG. 9). However, the sintering mechanism 700 can be otherwise configured.

Figure 2:
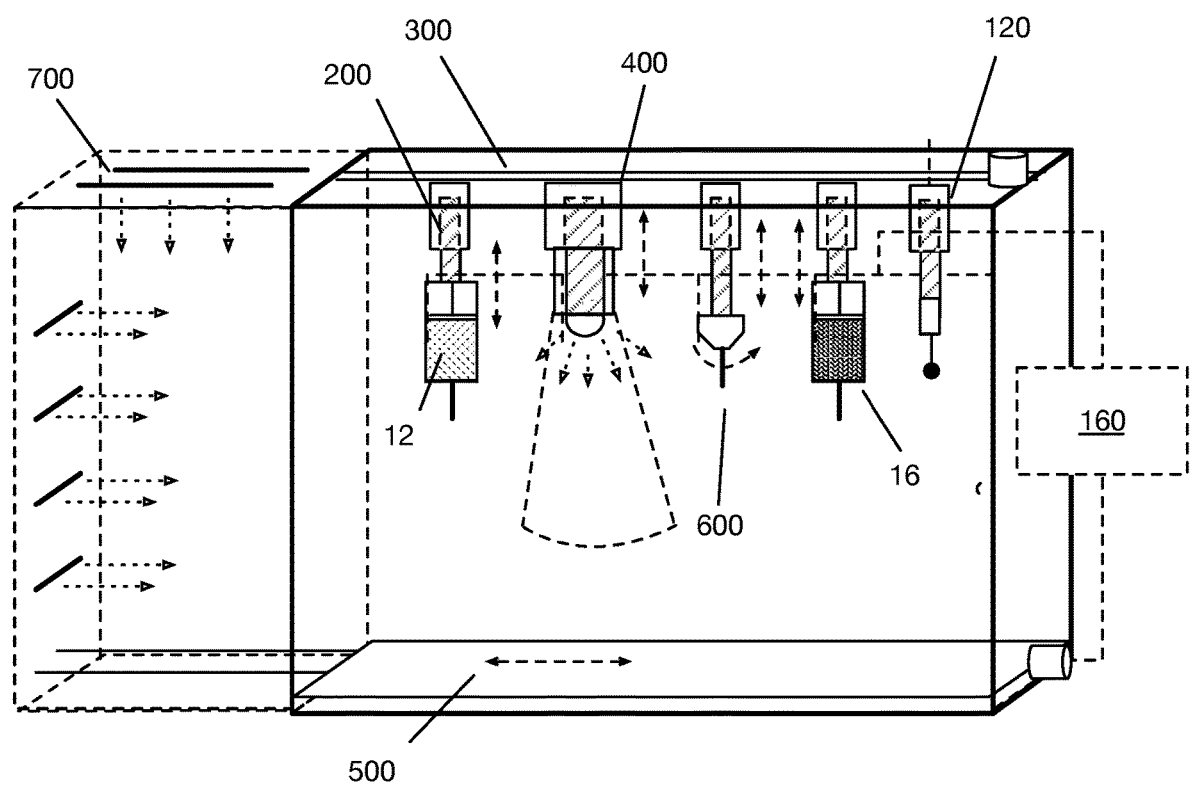
FIG. 2 is a schematic representation of an example of the system.

The sintering mechanism 700 can optionally include an environment control mechanism that controls the sintering environment while the sintering region is being sintered (example shown in FIG. 2). More preferably, the environment control mechanism creates an inert atmosphere surrounding the sintering region. Alternatively, the sintering region can be sintered under atmosphere, in the presence of a weakly reducing species such as aliphatic alcohol vapor or carbon monoxide gas, or in any other suitable atmosphere. In a first variation, the environment control mechanism includes an inert gas system, including an inert gas reservoir retaining the inert gas (e.g., mounted outside the working volume, mounted within the working volume, etc.) and a fluid outlet (e.g., nozzle, etc.) fluidly connected to the sintering region. The inert gas system can optionally include a heating element that heats the gas (e.g., to a target temperature), a flow control system 160 that controls gas flow through the system 100, or include any other suitable component. The inert gas can include N2, He, Ar, Ne, Kr, Xe, Rn, CO2, or any other suitable compound. In a first embodiment, the environment control mechanism forms an inert gas curtain surrounding the sintering region. In this embodiment, the fluid outlet is preferably statically coupled to and arranged around or adjacent the thermal mechanism, but can alternatively be separate from the thermal mechanism and independently controlled. This variant can optionally include a physical, gas impermeable curtain or baffle that controls fluid flow toward the sintering region. In a second embodiment, the environment control mechanism fills the working volume 140 with inert gas, wherein the housing (defining the working volume) cooperatively forms the environment control mechanism. In a second variation, the environment control mechanism includes a suction mechanism that pulls a vacuum and/or removes air from the volume adjacent the sintering region.

Figure 8:
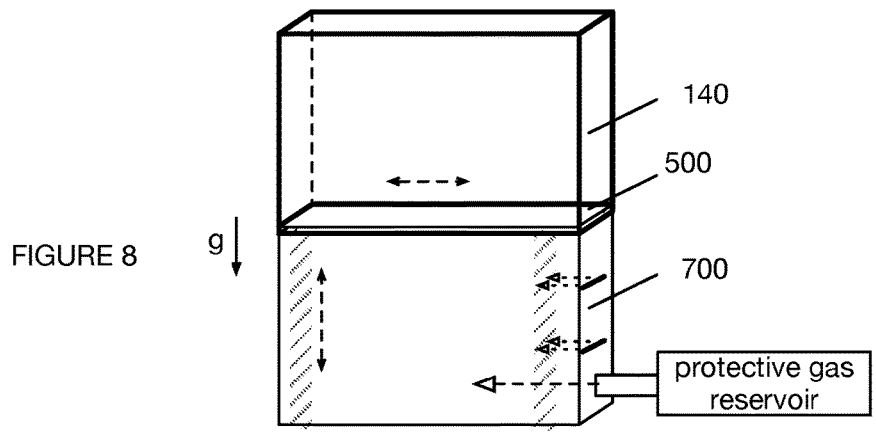
FIG. 8 is a schematic representation of an example of treatment volume arrangement relative to the working volume.

The system 100 can optionally include a treatment mechanism 800 that functions to treat the workpiece. Variants of the treatment mechanism 800 include: an annealing mechanism, tempering mechanism, or aging mechanism including a heating chamber; a quenching mechanism including a fluid cooling system (e.g., nozzle, reservoir, etc.) configured to immerse or spray a gas or liquid coolant onto the workpiece; a hardening mechanism including individually controlled heating elements and/or volumes; an metal infiltrating system that infiltrates an infiltrant metal into the printed matrix; a plating system; a passivating system; a carburizing system; a nitriding system; or include any other suitable treatment mechanism. In one example, the annealing mechanism can heat the workpiece 20 to a target temperature (e.g., 500-900° C.) over a predetermined heating duration (e.g., 30-300 minutes), hold the workpiece 20 at the target temperature for a predetermined hold time (e.g., 10-60 minutes), and cool the workpiece 20 to a second target temperature (e.g., ambient temperature) over a predetermined cooling duration. The additive removal mechanism 400 or sintering mechanism can double as the treatment mechanism; alternatively, the treatment mechanism 800 can be a separate component. The treatment mechanism 800 is preferably controlled by the control system 160 based on the measured workpiece temperature, but can be otherwise controlled. The system 100 can include one or more treatment mechanisms of same or different type. The treatment mechanism 800 is preferably arranged external the working volume 140 (e.g., above, below, adjacent to, or entirely separate from the working volume; examples shown in FIGS. 2 and 8), but can alternatively be arranged within the working volume, or be otherwise related to the working volume. The treatment mechanism 800 is preferably fluidly connected to the working volume, but can be otherwise connected.

The treatment mechanism 800 preferably includes a thermal mechanism, but can alternatively include a chemical treatment system or any other suitable system. The thermal system is preferably a heating chamber (e.g., furnace) including a heating element, but can alternatively include a directed heating system or any other suitable system. The heating chamber can be a muffle furnace, box furnace, or any other suitable heating chamber. The heating element 410 can include: an inductive heating element, resistive heating element, radiative lamp, combustion element, exothermic reaction, or any other suitable heating element.

The treatment mechanism 800 can optionally include an environment control mechanism, which can be the sintering mechanism's environment control mechanism, be the same mechanism as that of the sintering mechanism, or be different from the sintering mechanism's environment control mechanism. The annealing mechanism environment control mechanism preferably generates an inert or reducing atmosphere to prevent oxidation of the metal part, but annealing can alternatively occur in ambient atmosphere (e.g., when lower temperatures, such as 400-600 C is used), an oxidative atmosphere, or in any other suitable environment. Gasses that can be used to create the annealing atmosphere include argon, nitrogen, hydrogen, water, ammonia, carbon monoxide, carbon dioxide, boron-containing species, carbon-containing species, or any other suitable compound.

The treatment mechanism 800 can optionally include a transportation mechanism that transports the workpiece 20 into the annealing mechanism (example shown in FIG. 2). In a first variation, the transportation mechanism is the stage, wherein the stage 500 is actuated (e.g., lifted, dragged, slid, dropped, etc.) into the annealing mechanism. In a second variation, the transportation mechanism includes a cart that retains the stage 500 and moves the workpiece 20 into the annealing mechanism (e.g., through a controlled-environment passthrough, through ambient atmosphere, etc.). However, any other suitable transportation mechanism can be used.

The system 100 can optionally include a set of sensors 120 that function to monitor the working volume 140 during part manufacture (example shown in FIG. 2). The sensors 120 can provide the sampled signals to the control system 160, wherein the control system 160 can control and/or adjust system component operation and/or working volume parameters: dynamically in real- or near-real time, after the build process, or at any suitable time. The system component operation and/or working volume parameters can be controlled or adjusted using: equations, heuristics, probabilities, naïve Bayes methods, rules, decision trees, neural networks, genetic programs, support vectors, or any other suitable method, wherein the method can be trained, generated, or otherwise generated manually, using supervised learning, unsupervised learning, regression, or any other suitable method.

Sensors 120 that can be used include: optical sensors (e.g., multispectral cameras, hyperspectral cameras, visual range cameras, stereoscopic cameras, ambient light sensors, light emitting elements, LIDAR systems, laser projection systems, etc.), acoustic systems (e.g., radar, microphone systems, ultrasound systems, etc.), temperature sensors (e.g., thermocouple, IR analysis on an image of the working volume, etc.), pressure sensors, conductivity sensors (e.g., conductivity probe), resistivity sensors, chemical sensors (e.g., oxygen sensor), or any other suitable set of sensors. The system 100 can include one or more sensors 120 of the same or different type, mounted in an array or in different locations. The sensors 120 can be statically mounted to the working volume, translate with the deposition mechanism 200 (e.g., be mounted to the same translation mechanism as the deposition mechanism), translate independent from the deposition mechanism 200 (e.g., be mounted to a second, independent translation mechanism), or be mounted in any other suitable manner. In one example, the system 100 can include an optical system mounted adjacent the deposition mechanism, wherein the recorded images can be analyzed for material deposition rates, material deposition results (e.g., imperfections, gaps, puddles, etc.), additive removal conditions (e.g., temperature, drying uniformity across the layer, etc.), material manipulation results (e.g., gouges, imperfections, geometry variances from tolerance thresholds, surface finishes, etc.), sintering conditions, or any other suitable process parameter, wherein the sampled images can be analyzed using image analysis techniques, such as object recognition techniques including HOG and SIFT, identification, detection, or any other suitable technique; motion analysis techniques, such as optical flow; or any other suitable image-based technique. In a specific example, in response to determination that the layer 10 geometries differ beyond a threshold difference form a target geometry, the system 100 can automatically control the material manipulation mechanism 600 to remove all or some (e.g., a localized region) of the layer. In a second specific example, the system 100 automatically adjusts the extrusion parameters (e.g., temperature, extrusion rate, translation rate) based on the sensor feedback. However, the sensor feedback can be otherwise used.

The system 100 can include a control system 160, which functions to perform the method disclosed below, and/or control operation of all or a portion of the system components (example shown in FIG. 2). The control system 160 can be an on-board processor (e.g., microprocessor, CPU, GPU), remote computing system (e.g., server system connected through a wired or wireless connection, such as cellular, WiFi, or other technology), connected user device (e.g., through a wired or wireless connection, such as BLE, NFC, or WiFi), be a combination of the above, or be any other suitable control system 160. The control system 160 is preferably electrically connected to the system components, but can be otherwise connected to the components. The system 100 can include a power system, which functions to power the system components. The power system can be a battery system, power grid connector (e.g., plug), power conversion system, chemical reaction, or be any other suitable power system. However, the system 100 can include a tool changer 603, tool cleaner 602 (e.g., for the manipulation head 610, deposition head 210), communication system, user interface, or any other suitable component.

4. Method

As shown in FIG. 10, the method for additive metal manufacturing includes: selectively depositing a material carrier within the working volume S100; removing an additive from the material carrier S200; and treating the resultant material S300. The method can optionally include manipulating the material S400; and monitoring the additive manufacturing process and dynamically adjusting the additive manufacturing parameters based on process monitoring S500. The method is preferably performed by the system disclosed above, such as by the control system of the system disclosed above, but can be performed by a remote computing system (e.g., remotely controlling the system), or by any other suitable system.

A variation of the method includes depositing a layer of metal paste within the working volume, removing solvent from the deposited layer (e.g., drying the layer), manipulating the dried layer (e.g., machining the dried layer), sintering the dried layer, repeating the method for each successive layer of working material and/or support material until a workpiece with geometry approximating the virtual part model is formed, and sintering the workpiece. A second variation of the method includes: depositing layer of metal paste, manipulating the deposited layer (e.g., manipulating the wet layer), drying the manipulated layer, repeating the above processes until a workpiece with geometry approximating the virtual part model is formed, and sintering the workpiece. However, the method can be otherwise performed.

The printed workpiece (e.g., pre-sintering, post-deposition, post-additive removal, post-machining, etc.) preferably has geometry approximating the virtual model, and can have a near-net geometry or shape (e.g., within 10%, 5%, 3%, 1%, or less than 1% of the virtual part model geometry), be overprinted (e.g., have one or more dimensions that are larger than 10% of the virtual part model dimensions), be underprinted, or have any suitable geometry. In one variation, the printed workpiece (or layer thereof) can have the near-net geometry after layer deposition (e.g., for the entire part, a given slice), without layer manipulation. This variation can use a material carrier with a low shrinkage percentage (e.g., less than 20%, 15%, etc.), such as a binderless paste (e.g., that forms a high-density green body), or any other suitable material carrier. In a second variation, the printed workpiece can have the near-net geometry after layer manipulation. This variation can include overprinting the layer(s) (e.g., at a first, low resolution), then machining the layer(s) to the near-net geometry (e.g., at a second, higher resolution associated with the virtual part tolerance), or otherwise achieving the near-net geometry post-manipulation. This variation can use a material carrier with a low shrinkage percentage, a working temperature close to or encompassing the uncooled machining tool operation temperature (e.g., such that the localized layer regions do not breathe pre- or post-machining), or any other suitable component or set of parameters. The printed workpiece (e.g., green body or brown body) preferably has a high density, such as over 60%, over 65%, over 75%, or over any suitable percentage density; however, the printed workpiece can have any suitable density.

The sintered workpiece preferably has a near-net geometry or geometry substantially matching the virtual part model (e.g., within the tolerances associated with the virtual part model), but can alternatively have any suitable geometry. The sintered workpiece preferably has a high density (e.g., higher than 80%, 95%, 99%, etc.), but can have any suitable density.

Selectively depositing a material carrier within the working volume S100 functions to selectively build the workpiece geometry, layer by layer. The resultant workpiece can be a green body, brown body, or have the desired final composition. The resultant workpiece can have near-net geometry or have any other suitable shape. The material carrier is preferably deposited using the deposition mechanism described above, but can alternatively be deposited using any other suitable system. The material can be working material, support material, or any other suitable material. The material carrier is preferably a paste including the material and a solvent, but can be any other suitable material carrier. Working material and support material can be concurrently deposited (e.g., concurrently operating different deposition mechanisms, which can be statically coupled together or actuate relative to each other), sequentially deposited (e.g., depositing alternating layers of working material and support material), deposited in batches (e.g., depositing a plurality of working material layers, then depositing a plurality of support material layers), or deposited in any other suitable order. The material carrier is preferably deposited in a predetermined location within the working volume, but can be randomly deposited (e.g., and subsequently selectively removed) or otherwise deposited. The predetermined locations are preferably determined based on a virtual part model (e.g., received from a user account, received from a computer aided design environment, etc.) using a virtual slicing method, but can be otherwise determined. The material carrier is preferably deposited as a shaped layer (e.g., tracking the geometry of the virtual part slice), but can alternatively be deposited as a substantially contiguous layer (e.g., wherein the part geometry is subsequently defined in the layer), or otherwise deposited. The dimensions of the printed layer (e.g., width, thickness, length, etc.) can be determined based on the respective virtual model slice, the anticipated amount of shrinkage or deformation during subsequent processing processes (e.g., drying, sintering, annealing, machining, etc.), the resolution of the system, deposition mechanism, and/or material manipulation mechanism, the tolerance associated with the virtual part model, the printed geometry, or otherwise determined. The printed layer preferably has a resolution lower than the final part resolution, but can alternatively have the same or higher resolution.

In an embodiment including a hybrid manufacturing process, the layer can be printed at a first resolution, then machined at a second resolution higher than the first resolution. The first resolution can be outside of a resolution range associated with a virtual part tolerance (e.g., tolerance associated with the virtual part), while the second resolution can be within said resolution range. The resolution range associated with the tolerance can be predetermined, empirically determined, calculated, selected, or otherwise determined. The resolution range preferably results in a final part (e.g., post-processing) having physical part dimensions within the virtual part tolerance (e.g., wherein the resolution range accommodates for part shrinkage during post-processing), but can alternatively result in a workpiece (e.g., green body, brown body) with dimensions within the virtual part tolerance, or be otherwise associated with the virtual part tolerance. However, the first and second resolutions can be otherwise related. In one example, the width and/or length of each layer can be overprinted by a predetermined percentage (e.g., 3%, 10%, etc.), wherein subsequent machining processes (e.g., milling) removes the excess material. However, the layer dimensions can be otherwise determined. The layer is preferably deposited at a layer deposition temperature, which can be the temperature of the material or material carrier measured upstream of the deposition head, at the deposition head, at the deposited layer, between the deposition head and the layer, or at any other suitable location. The deposited layer (e.g., printed layer, layer post-deposition) preferably has a printed layer temperature, which can be equal to, higher than, or equal to (e.g., after equilibration): the layer deposition temperature, the workpiece's temperature (e.g., workpiece temperature), the previous layer temperature (e.g., temperature of the layer upon which the deposited layer was deposited), the working volume temperature or ambient temperature, or any other suitable temperature.

Depositing material carrier S100 preferably includes: moving the respective deposition mechanism to the predetermined location within the working volume with the translation mechanism, depositing the material carrier according to a predetermined set of deposition parameters, but can be otherwise deposited. The deposition parameters can include: deposition speed (e.g., rate), deposition pressure, translation speed, layer thickness, layer width, layer length, layer spacing, material carrier temperature, material carrier viscosity, material carrier composition, material carrier density, or include any other suitable parameter. The deposition parameters can be predetermined (e.g., based on the virtual model, the material carrier composition, the material), dynamically adjusted (e.g., based on sensor feedback using a neural network, heuristics, or other determination method), or otherwise determined.

In one variation, depositing the material carrier includes flowing a material paste out of a nozzle into the working volume. In a second variation, depositing the material carrier includes heating a material filament (e.g., feedstock, metal admixed with thermoplastic, etc.) with a hot end (e.g., heated print head) to a softening temperature (e.g., temperature just below the melting point of the material filament)

prior to softened filament extrusion from the hot end and deposition into the working volume. In this variation, the deposited layer can harden at the working temperature, harden under subsequent heating (e.g., applied by the additive removal mechanism), remain soft under the working temperature (e.g., to promote inter-layer adhesion), or have any other suitable characteristic under the working temperature of the working volume.

Figure 11:
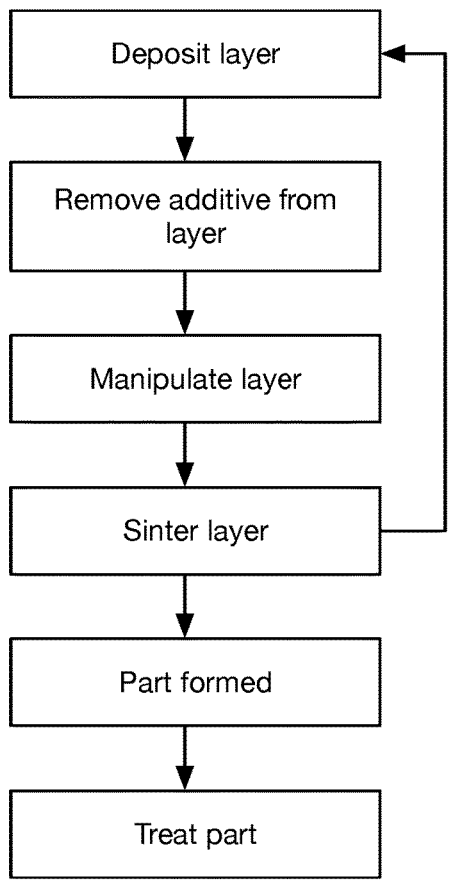
FIGS. 11, 12, and 13 are flowchart representations of a first, second, and third variation of the method, respectively.

Removing an additive from the material carrier S200 functions to dry, sinter, or otherwise process the material carrier. The resultant workpiece can be a green body, brown body, or have the desired final composition. The resultant workpiece can have near-net geometry or have any other suitable shape. The removed additive is preferably solvent, but can alternatively be binder, gaseous bubbles, crystalline deformations, dislocations, or any other suitable compound or inclusion. The additive is preferably removed with the additive removal mechanism, but can be removed by any other suitable component. The additive is preferably removed within the working volume, but the workpiece can be transported to a second volume for additive removal and optionally returned to the working volume for subsequent material addition processes. The additive is preferably removed after layer deposition and before material manipulation (shown in FIGS. 11 and 12), but can alternatively be removed before or during layer deposition; before, during, or after material deposition; during or after material manipulation; or be removed at any other suitable time. The additive can be removed on a layer-by-layer basis; concurrently removed from multiple layers of working material, multiple layers of support material, or mixed layers of support and working material; concurrently removed from a workpiece with near net geometry; or removed at any other suitable time. The additive can be removed from the entirety of a material layer, from a subset of the material layer, or removed from any other suitable material layer portion. In one example, a first portion of the layer is dried (e.g., additive removed) as a subsequent portion of the layer is being deposited, wherein the additive removal mechanism follows deposition mechanism translation. In a second example, the layer is dried after the entire layer is deposited. In a third example, the ambient volume proximal the predetermined location is maintained within a working temperature range, wherein the working temperature range encompasses or is higher than the phase transition point (e.g., normal boiling point) of the additive. The additive is preferably removed according to a set of removal parameter values (e.g., removal duration, temperature, pressure, location, power supplied to additive removal mechanism, cycling schedules, etc.) that can be predetermined (e.g., for the entire part, for the material, for the specific layer, etc.), dynamically determined (e.g., based on results from the preceding layer, from adjacent layer regions, from instantaneous workpiece parameters, etc.), or otherwise determined. In a specific example, the removal parameter values can be set on a layer-by-layer basis, such that different layers in the resultant part can have different material properties.

Removing the additive S200 can include: controlling the temperature of the deposited material carrier, holding the deposited material carrier within a target temperature range, adjusting (e.g., dynamically, according to a predetermined schedule, cycling, etc.) the deposited material carrier temperature, heating (and optionally holding) the deposited material carrier within a target temperature range, applying a reagent to the deposited material carrier, catalyzing a reaction in the deposited material carrier, or otherwise removing the additive. The deposited material carrier is preferably held at a target temperature range equal to or lower than a reference temperature, but can alternatively be held at a temperature higher than, equal to, and/or otherwise related to the reference temperature. Alternatively, the deposited material carrier can be heated to a temperature range above the reference temperature, or otherwise thermally manipulated. The reference temperature can be the layer deposition temperature, the workpiece temperature, the previous layer temperature, the substrate temperature (e.g., wherein the substrate can be the build plate, the previous layer, or the workpiece that the new layer is deposited upon), working volume temperature, local volume temperature (e.g., of the volume that the deposited layer will occupy, the volume adjacent the deposited layer's volume, etc.), or any other suitable temperature. The temperature of the deposited material carrier can be locally controlled or globally controlled. For example, the method can control the temperature of the working volume proximal or adjacent the deposited layer, the temperature of the entire working volume, or the temperature of the layer itself. The temperature of the deposited material carrier can be controlled for the newest deposited layer, for all deposited layers, for specific layers (e.g., layers formed from a given material, layers with a large influence on the resultant part geometry, etc.), or for any suitable set of layers.

The working volume is preferably held at the working temperature (e.g., target temperature), but the working temperature can additionally or alternatively be set for the deposited layer, the layer being deposited, a working volume voxel proximal and/or within the layer volume (e.g., volume that the deposited layer will occupy), the previous layer (e.g., that the layer is being deposited upon), one or more workpiece layers, or any other suitable volume within the working volume. The working temperature is preferably equal to or less than a reference temperature, but can alternatively be higher than or otherwise related to the reference temperature (e.g., the same or different reference temperature as that for the deposited material carrier).

The deposited material carrier parameters (e.g., temperature, pressure, etc.) can be actively or passively controlled. The parameters can be controlled by controlling parameters of the paste (e.g., during deposition, after deposition), the working volume, a localized volume (e.g., proximal the layer(s)), a layer volume (e.g., volume that the layer occupies or will be occupying), or any other suitable volume. In one variation, controlling the parameters includes maintaining the temperature of volume next to (e.g., adjacent, contiguous, overlapping) the prior layer (e.g., or support material, print material, or any other suitable material), at or below a reference temperature during a predetermined time frame. The volume can be the working volume surrounding the layer, the volume between the deposited layer and the print heat, the next layer volume, or any other suitable volume. In a second variation, controlling the parameters includes maintaining the temperature of the layer itself at or below a reference temperature during a predetermined time frame. In a third variation, controlling the parameters includes maintaining the temperature of the previous layer at or below a reference temperature during a predetermined time frame. In a fourth variation, controlling the parameters includes maintaining the temperature of the volume proximal the next layer at or below a reference temperature during a predetermined time frame. However, the parameters can be otherwise controlled. The reference temperature can be the working volume temperature, previous layer temperature, layer deposition temperature, or be any other suitable temperature. The time frame can be: throughout a method process (e.g., throughout deposition, throughout manipulation, etc.), within a method process (e.g., during a portion of deposition or manipulation), between method processes (e.g., after deposition until manipulation, etc.), or be any suitable time.

In a first variation, holding the deposited material carrier within the temperature range can include maintaining and/or selectively heating or cooling all or a portion of the working volume to the working temperature range with waste heat from the machining head, an active temperature control system (e.g., a set of actively controlled heating elements), or a combination thereof. In one example, the working volume voxel(s) proximal the printed layer can be maintained (held) at the working temperature (example shown in FIG. 14) throughout the deposition process of one or more subsequent layers. In a second example, the deposited material is not heated by a localized heating element (e.g., hot air, laser) within the working volume between deposition and machining and/or next layer deposition. In a second variation, holding the deposited material carrier within the temperature range can include maintaining the temperature of a volume (e.g., of the working volume, of the volume the layer is being deposited into, of the layer being deposited, of the deposited layer, etc.) adjacent the previous layer at or below the reference temperature (e.g., layer deposition temperature, previous layer temperature, etc.): after deposition until selective machining; throughout subsequent layer deposition; or for any suitable time period. In one example, this includes heating the deposited material carrier or layer with a heat lamp remote from the deposited material layer to maintain the ambient working temperature within the working temperature range. In a third variation, heating the deposited material carrier includes moving an inductive element or resistive heating element proximal the layer and operating said element in an additive removal mode. In a fourth variation, heating the deposited material carrier includes directing a localized heating element (e.g., laser, hot gas) at the layer and operating the localized heating element in an additive removal mode. However, the additive can be otherwise removed.

The method can optionally include manipulating the material S400, which functions to refine the geometry of the printed material. Examples of geometry refinement can include: removing the material to achieve a desired geometry, finishing a material surface (e.g., side, top), patterning a material surface (e.g., to achieve a desired pattern, to increase the inter-layer binding area, etc.), or otherwise refining the geometry of the material surface. The manipulated layer and/or resultant workpiece preferably has a near-net geometry, but can alternatively have a larger geometry or any other suitable geometry.

Material manipulation S400 can additionally or alternatively change the material properties of the printed material (e.g., work harden the material). The material is preferably manipulated within the working volume but can alternatively be manipulated in a separate volume (e.g., wherein the workpiece is transferred to the separate volume for manipulation). The material is preferably manipulated by the material manipulation mechanism, but can alternatively be otherwise manipulated. The manipulated material can be the working material, the support material, or be any other suitable material. Material manipulation can be applied globally (e.g., to the entire layer or piece), locally (e.g., to a sub-region of the layer), or to any other suitable workpiece region.

Figure 12:
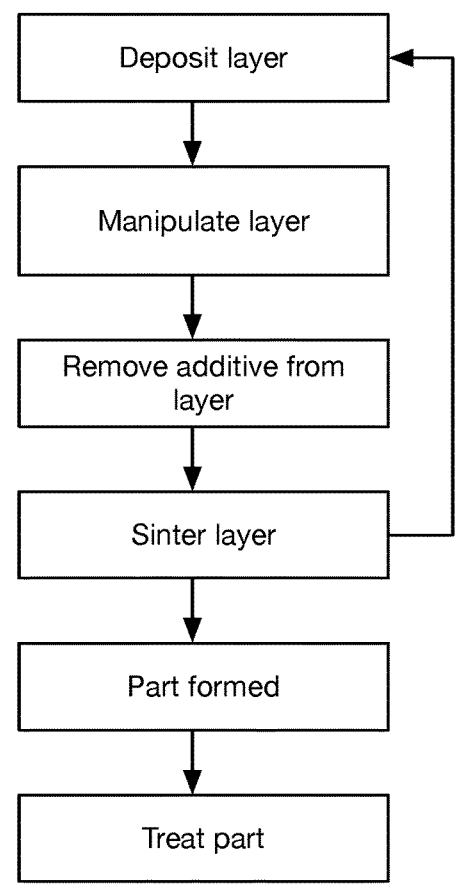
Figure 15:
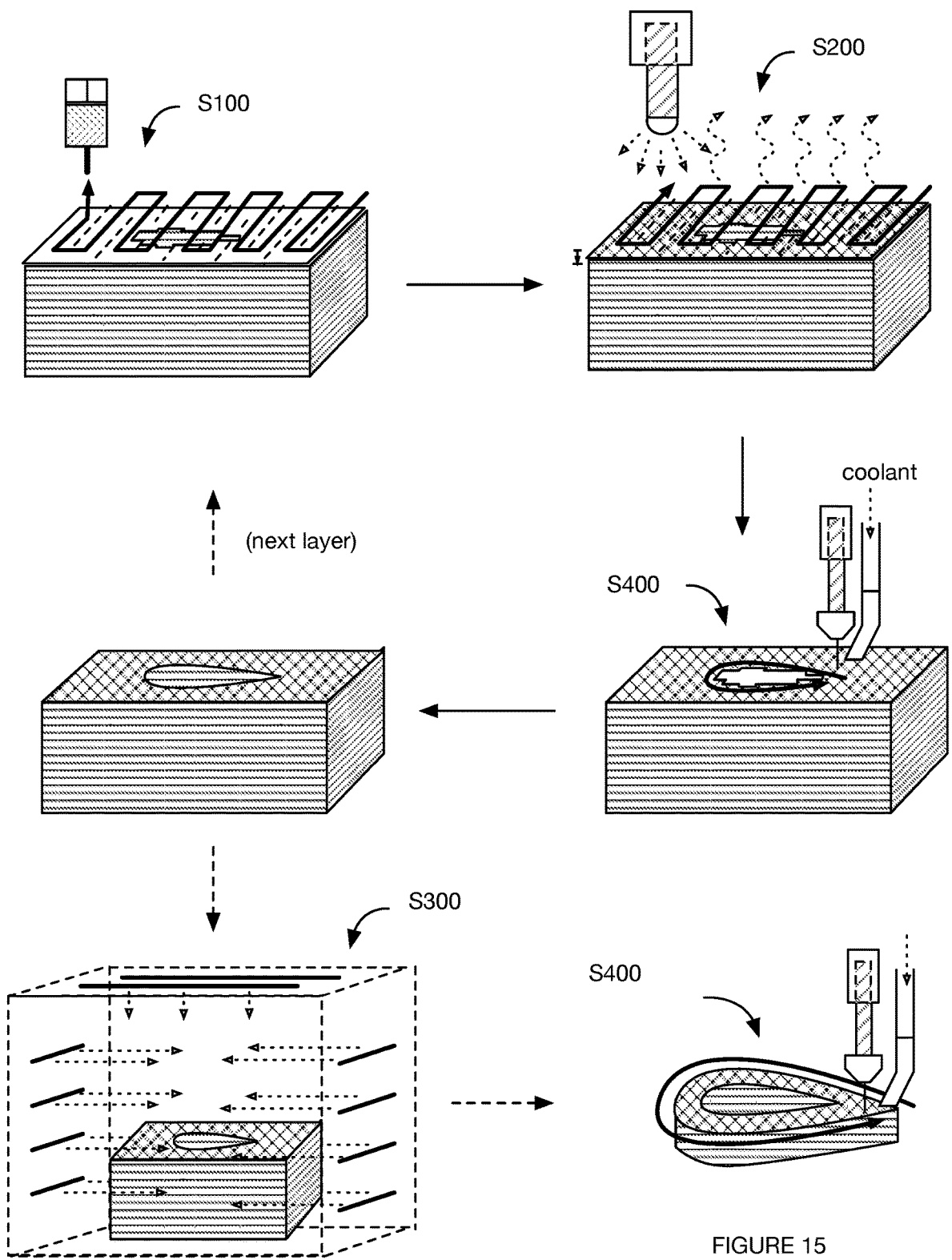
Figure 16:
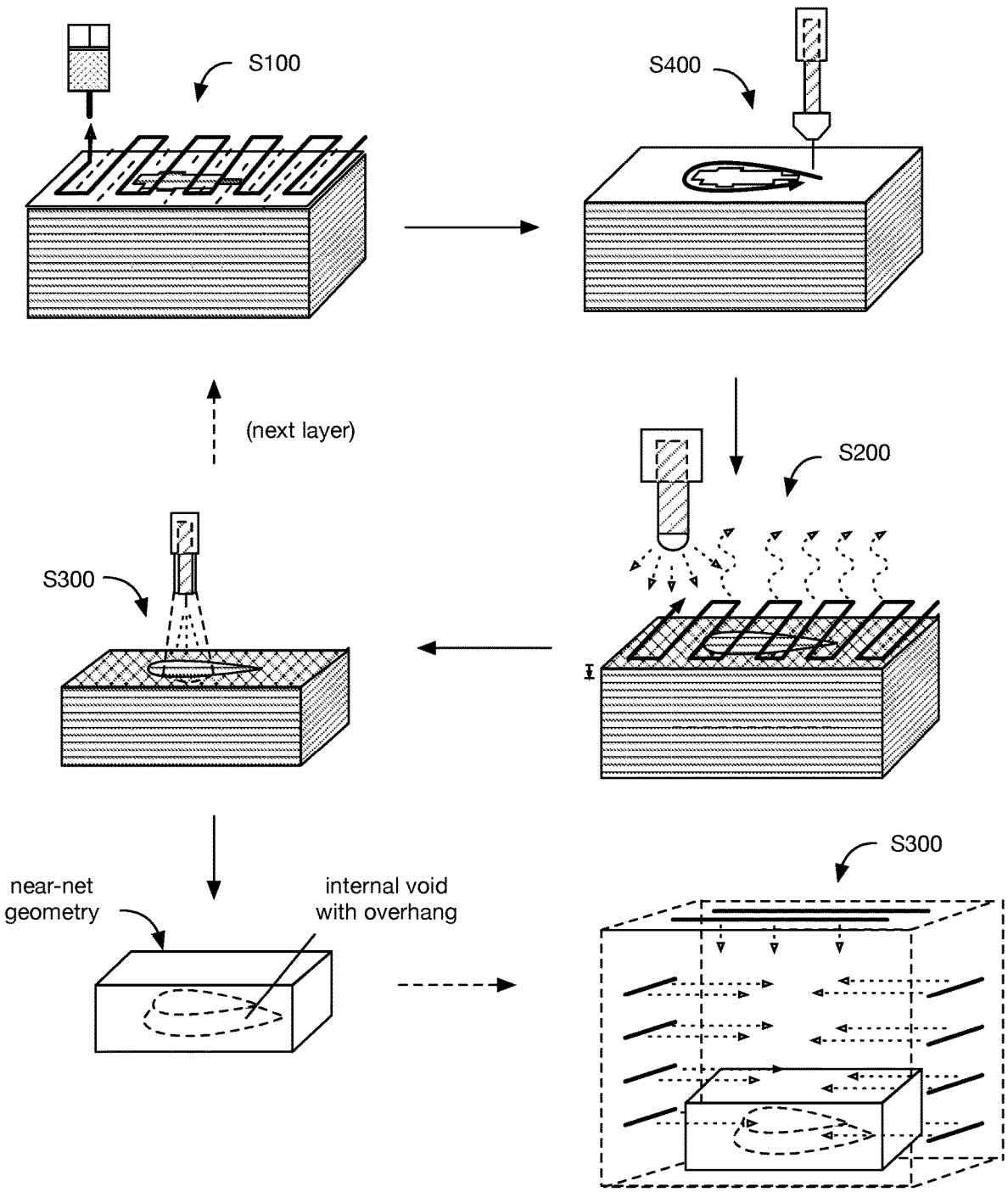
Figure 17:
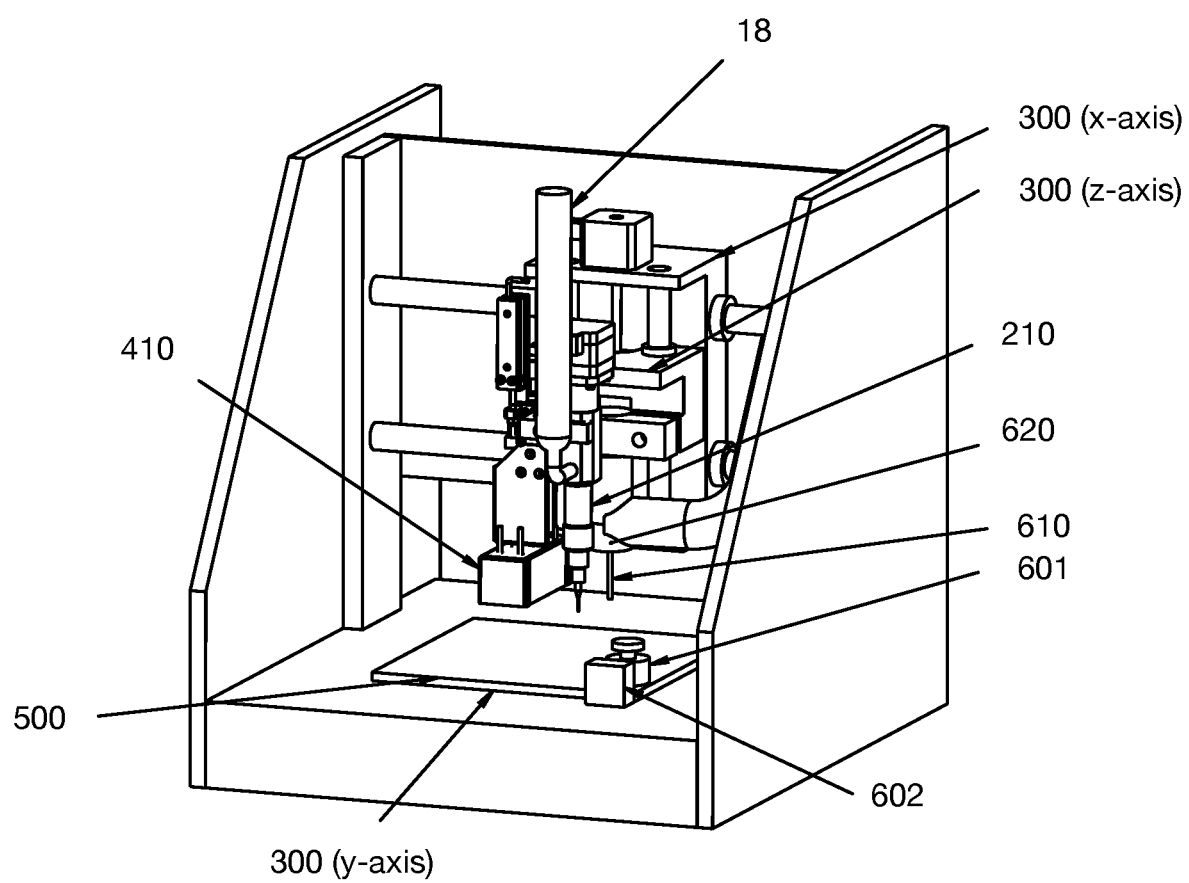
FIGS. 17 and 18 are a first and second example of the system, respectively.
Figure 18:
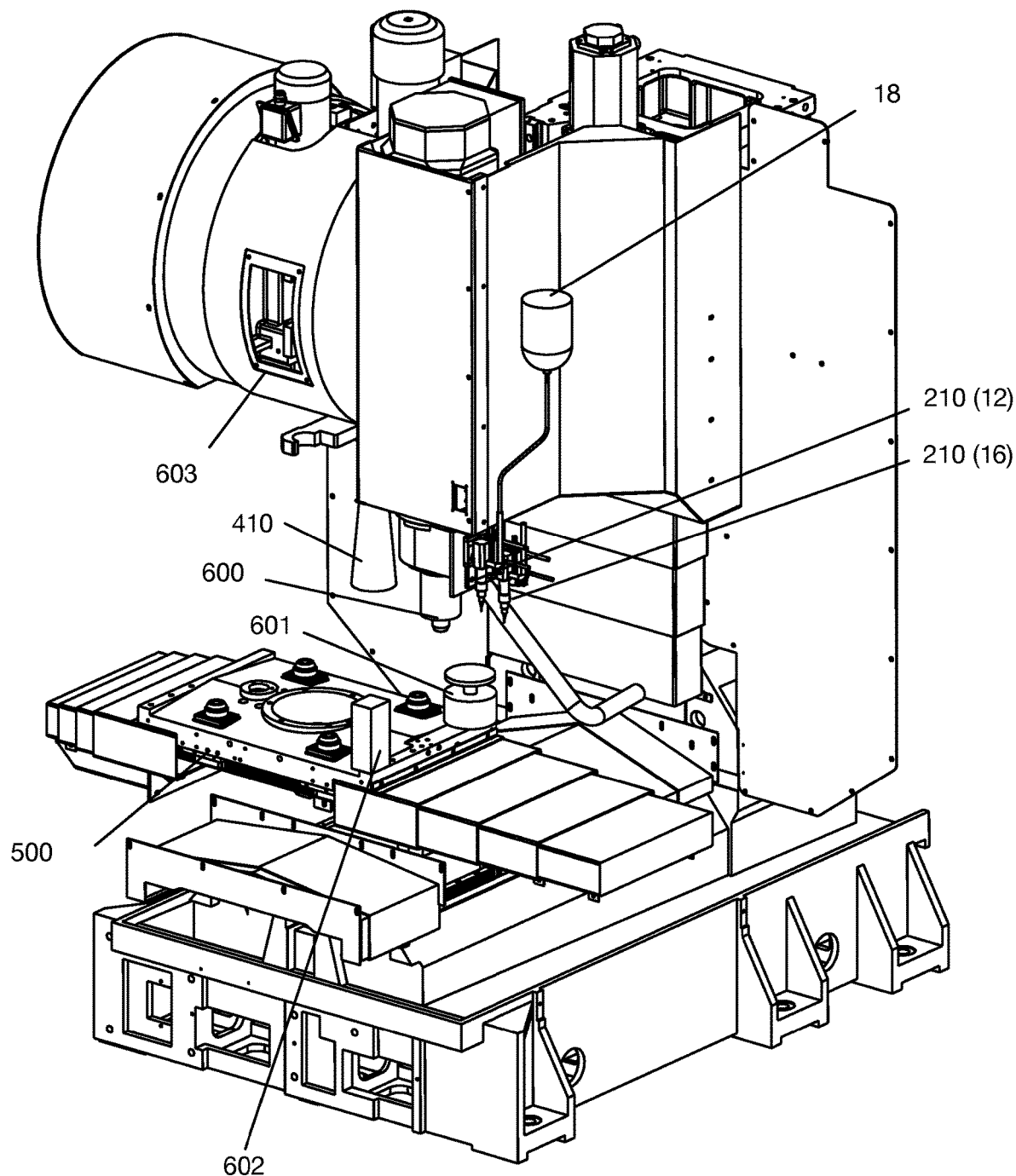
Figure 19:
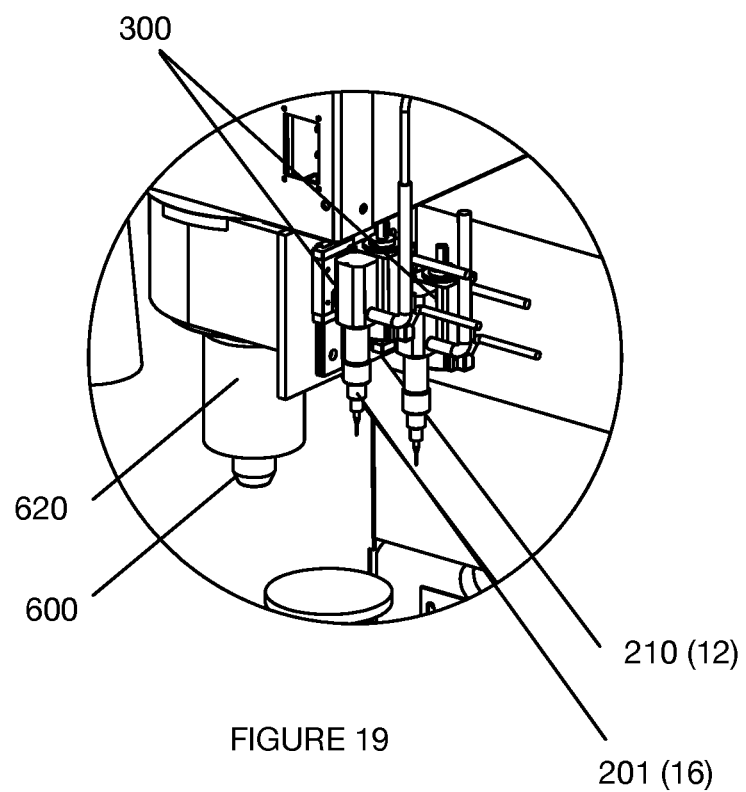
FIG. 19 is an example of the deposition head and manipulation head arrangement.

The material is preferably manipulated after material deposition, more preferably after layer deposition and/or solvent removal (example shown in FIGS. 11 and 15), but can alternatively be manipulated: during layer deposition (e.g., a first portion of the layer manipulated as a second portion is being deposited); before additive removal (e.g., drying; solvent removal) as shown in FIGS. 12 and 16, sintering, or material treatment; after additive removal; after a rough part has been printed (e.g., sprayed into a mold); or at any other suitable time. The material is preferably manipulated on a layer-by-layer basis (e.g., manipulated after each layer is deposited, sintered, or treated), but can include concurrently manipulating multiple layers (e.g., the method includes printing multiple layers, then manipulating the plurality of layers), manipulating the near-net geometry workpiece (e.g., the workpiece itself can be machined), or manipulating the part precursor at any other suitable time.

All or portion of each layer (e.g., interior sides, exterior sides, broad face, etc.) can be manipulated. In one variation, the method can include printing a plurality of support layers, machining the plurality of support layers to define a negative of the desired geometry, and printing working material into the negative. In a second variation, the method can include printing a working material layer, machining the interior sides of the layer to a predetermined geometry and/or finish, repeating the process until all layers are printed, and finishing the workpiece exterior with a secondary machining process. However, material manipulation can be otherwise used.

The manipulated portion of each layer is preferably determined based on the virtual part slice, but can alternatively be determined based on sensed layer parameters of the deposited layer (e.g., using an optical system), or otherwise determined. In one variation, the method includes: determining (e.g., estimating) a layer volume within the working volume based on the virtual part slice, and determining the location and position of the layer portion (to be manipulated) based on the portions of the layer volume extending beyond the virtual part slice. The manipulated portion location can be relative to the layer position, relative to a working volume reference point (e.g., using the working volume coordinates), based on translation mechanism odometry, or otherwise determined. In a second variation, the method includes: determining the layer parameters of the deposited layer (e.g., layer dimensions, layer position, layer volume, layer configuration, etc.), comparing the deposited layer to the reference virtual part slice (or a derivative virtual part slice that accommodates for part dimensional change throughout the process), and determining the deposited layer portions extending beyond the reference virtual slice as the manipulated portion(s). The layer parameters can be determined using computer vision techniques, odometry techniques (e.g., wherein the layer dimensions are determined from the translation mechanism's prior locations), weight-sensor based techniques (e.g., wherein the layer parameters are determined from the amount and position of the workpiece weight change as measured at the stage), feed rate techniques, or otherwise determined.

Variants of manipulating the material include: machining the material with a cutting tool, such as a mill; spreading the material; ablating the material, such as with a laser (e.g., the same or different from the additive removal mechanism); grinding the material with a grinder, polishing the material; electric discharge machining the material; milling the material; etching the material; sputtering the material; coating the material; or otherwise manipulating the material. In a specific example, the method includes machining excess material from the deposited, dried material layer to meet a predetermined geometry, determined from the virtual part model. In a second specific example, the method includes directing one or more lasers at excess material, wherein the lasers heat the binder to generate a gaseous product that ablates or cavitates to remove excess material. Different manipulation methods can be used for different material types (e.g., a first method for the working material, a second method for the support material), different material layers (e.g., a first method for intervening layers, a second method for the top layer), different layer regions (e.g., a first method for layer sides, a second method for the layer broad face), or other workpiece portions; however, the same manipulation method can be used.

Manipulating the material S400 can optionally include cooling a cooled region proximal the manipulation head. Alternatively, the localized region cannot be cooled (e.g., remain uncooled). The cooled region can be the manipulated portion of the layer, proximal portions of the workpiece, the manipulation head 610, a localized portion of the working volume proximal the manipulated layer portion or manipulation head, or be any other suitable region. The cooled region can be cooled before, during, or after manipulation. The cooled region can be cooled by: spraying coolant toward the cooled region; removing hot gas from the cooled region (e.g., using a vacuum); moving cooler fluid toward the cooled region (e.g., blowing cooler gas toward the region, liquid cooling the manipulation head, such as through a channel within the head); or otherwise cooling the cooled region.

The method can optionally include treating the material S300, which functions to adjust the material properties of the material. Treating the material can include: sintering, annealing, aging, quenching, tempering, selectively heat treating (e.g., using differential hardening, flame hardening, induction hardening, case hardening, etc.), cryogenic treating, decarburizing, sputtering, coating, work hardening, passivating, or otherwise treating the resultant material. The material treatment is preferably performed by the treatment mechanism (e.g., annealing mechanism, etc.) according to a set of treatment parameter values, but can be performed by the additive removal mechanism, the sintering mechanism, or by any other suitable mechanism. The treatment parameter values can be determined based on the desired part properties, be manually determined by a user, be determined based on the working material, or be otherwise determined. The material treatment is preferably performed in a treatment volume separate from the working volume, wherein the workpiece is transferred (e.g., lifted, dropped, slid, etc.) into the treatment volume, but can alternatively be performed within the working volume. The material treatment is preferably applied after the piece is completely printed (e.g., applied to the final workpiece with near-net geometry), but can alternatively be applied before, during, or after each layer or plurality thereof has been deposited, dried, or manipulated, be treated after the part is sintered, or at any other suitable time.

Treating the material can include sintering the material, which functions to further compact the material and/or prevent workpiece deformation from subsequent dimensional changes. Sintering the material can optionally release the workpiece from the stage (e.g., by deactivating or burning off the workpiece-stage interface layer), remove support material (e.g., de-bind the support material, decompose the support material, etc.), or perform any other suitable function. The material is preferably sintered by the additive removal mechanism, but can alternatively be sintered by a dedicated sintering mechanism or by any other suitable mechanism. The material is preferably sintered within the working volume (e.g., in-situ) but can alternatively be sintered in a separate volume. In the latter variant, the workpiece, stage and workpiece, or other set of components can be removed from the working volume and inserted into the separate volume. One or more layers of same or different material can be concurrently sintered. For example, each layer can be sintered after the layer is deposited and dried (e.g., additive removed). In a second example, multiple layers can be sintered together. All or a portion of a layer can be sintered. For example, a first layer region can be sintered while a second layer region remains unsintered.

Sintering the material preferably includes heating the material (e.g., with a heat lamp, with unfocused light, etc.) according to a set of sintering parameters (e.g., temperature, duration, cycling patterns), but the material can be otherwise sintered. Sintering the material can additionally include: creating a controlled environment surrounding a sintering region of the workpiece; and sintering the material within the controlled environment (e.g., operating the additive removal mechanism in a sintering mode). In a first variation, creating the controlled environment includes filling a sealed working volume with inert gas (example shown in FIG. 8). This can be performed before the material is deposited (e.g., wherein the entire process is performed in a controlled environment), after material deposition (e.g., wherein part of the process, such as sintering, is performed in the controlled environment), or at any other suitable time. In a second variation, creating the controlled environment includes creating a localized controlled environment by flowing inert gas through a nozzle directed at the sintering region (example shown in FIG. 2). The inert gas is preferably heavier than air, but can alternatively be lighter than air. Sintering the material can optionally include moving the sintering mechanism 700 to the sintering region (e.g., with the translation mechanism). In one variation, the first portion of the layer is sintered as a subsequent portion of the layer is dried or deposited. In a second variation, a layer is sintered after the layer is deposited and dried. However, the material can be sintered at any other suitable time.

The method can additionally include monitoring the manufacturing process using a set of sensors S500 and adjusting subsequent manufacture based on the sensor outputs. The sensors can include any combination of those described above, or include any other suitable set of sensors. Examples of manufacturing process parameters that can be monitored include: layer surface finish, layer deformities, layer temperature, material temperature, material feed rate, material manipulation properties (e.g., chip shape, chip color, etc.), or any other suitable parameter. In a first example, this can include: recording images of the workpiece within the working volume and analyzing the images to extract manufacturing characterizations (e.g., using image segmentation, object recognition, topology analysis, motion detection, video tracking, optical flow, pose estimation, object classification, etc.). In response to layer defect detection (e.g., incorrect geometry, gouges, scratches, material carrier anisotropy, etc.), the method can include: removing and reprinting the entire layer (e.g., with the material manipulation mechanism); removing and reprinting a layer portion contiguous with the defect; or otherwise fixing the defect. The response to layer defect detection can be predetermined, dynamically determined (e.g., based on an optimization function, heuristics, historical data, etc.), or otherwise determined. In a second example, the method can include detecting a deposition mechanism slow-flow state (e.g., from the images, from a flow sensor on the deposition head, etc.) and automatically: notifying a user (e.g., at a user device, by playing a sound, etc.), initiating a cleaning process (e.g., dipping the deposition head in a cleaning solvent, purging a set amount of material, cycling through different temperatures, etc.), or otherwise reacting to the slow-flow state. In a third example, the method can include determining a difference between an actual and expected workpiece position within the working volume (e.g., based on image analysis, probe readouts, etc.), and automatically adjusting the printing instructions (e.g., the printing coordinates) to accommodate for the positional shift. In a fourth example, the sensor measurements recorded during manufacture can be used to determine operation parameters for manufacture of subsequent related parts. For example, the sensor measurements, coupled with quality control classifications, can be used to train a neural network that automatically determines the manufacturing parameter values for subsequent part manufacture. However, the feedback can be otherwise used.

Figure 13:
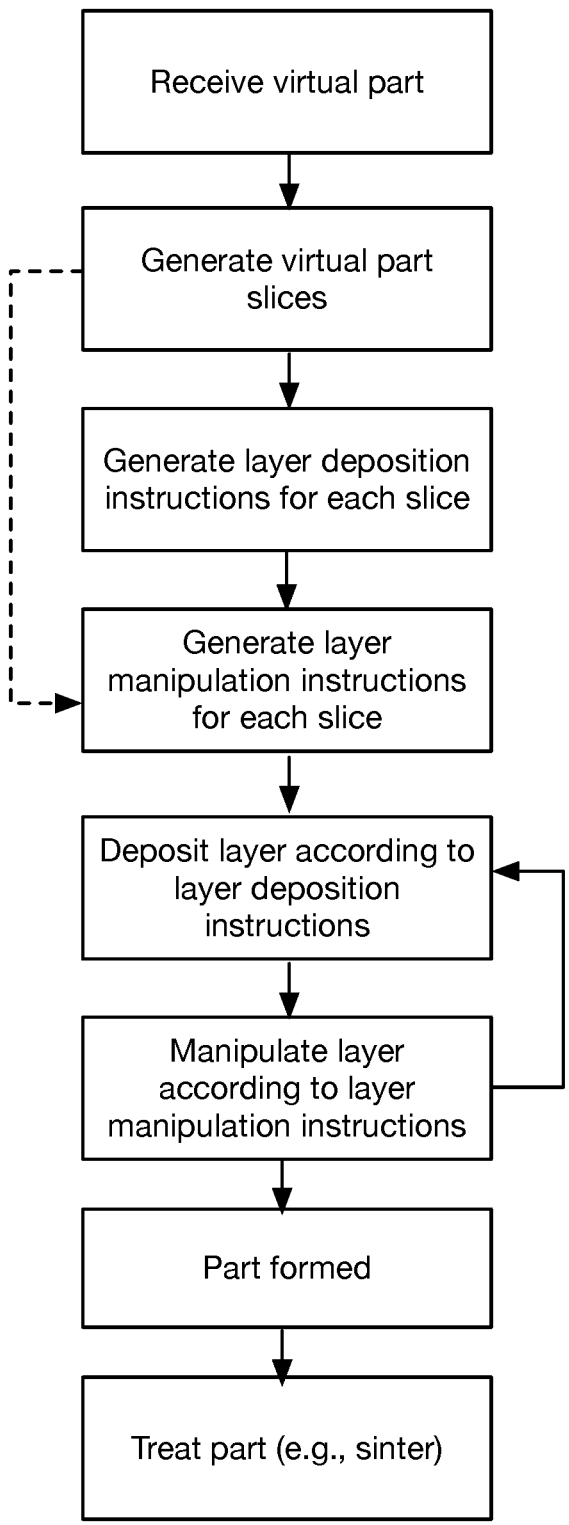

The method can optionally include receiving a virtual part model Shoo, wherein the virtual part model specifies the desired geometry of the final part (example shown in FIG. 13). The virtual part model can be received from a user, a remote computing system (e.g., server), or from any suitable source. One or more virtual part models can be received at one or more times from the same or different sources, and can be manufactured in parallel (e.g., in the same working volume, in different working volumes, etc.), serially, in the same run, or in any suitable order. The virtual part model preferably specifies the part geometry, and can optionally specify the desired tolerance range, materials, or any other suitable information. The method can optionally include transforming the virtual part model to accommodate for anticipated dimensional changes during physical part manufacture (e.g., increasing the virtual part model dimensions along one or more axes). The transformation can be determined: manually, empirically, heuristically, iteratively, using a neural network, probabilistically, or otherwise determined.

Embodiments of the system and/or method can include every combination and permutation of the various system components and the various method processes, wherein the method processes can be performed in any suitable order, sequentially or concurrently.

As a person skilled in the art will recognize from the previous detailed description and from the figures and claims, modifications and changes can be made to the preferred embodiments of the invention without departing from the scope of this invention defined in the following claims.

We claim:

1. A method for forming a physical object, the method comprising:
    based on a virtual part model, within a build volume, using a metallic build material, fabricating a part with a geometry corresponding to the virtual part model; and
    after fabricating the part, sintering the part to form the physical object;
    wherein:
    the metallic build material comprises a volatile solvent;
    the metallic build material comprises less than 1% polymeric binder by weight;
    fabricating the part comprises, for each layer of a plurality of layers of metallic build material:
        based on the virtual part model, depositing the layer of metallic build material within the build volume, wherein the deposited layer retains a deposited geometry;
        removing the volatile solvent from the layer; and
        based on the virtual part model, after removing the volatile solvent from the layer, selectively machining a portion of the layer within the build volume;
    the part defines a first volume before sintering;
    the physical object defines a second volume after sintering; and
    a difference between the first volume and the second volume is between 5% and 12%.

2. The method of claim 1, wherein the metallic build material is a binderless metal paste comprising:
    metal scaffold particles comprising iron, the metal scaffold particles having a D50 particle size; and
    metal infiltrant particles with a D50 particle size of less than 20% of the D50 particle size of the metal scaffold particles, wherein the metal infiltrant particles primarily position in interstitial spaces between the metal scaffold particles.

3. The method of claim 2, wherein:
    the metal scaffold particles have a D50 particle size between 1 µm and 8 µm; and
    the metal infiltrant particles have a D50 particle size between 50 nm and 1 µm.

4. The method of claim 1, wherein a first layer of the plurality is deposited onto a substrate held at a substrate temperature, wherein each layer of the plurality is not locally heated between layer deposition and selective machining.

5. The method of claim 1, wherein, for each layer of the plurality, the portion of the layer is selectively machined by a tool, the method further comprising maintaining an ambient volume proximal the portion of the layer within an uncooled tool operating temperature range throughout fabricating the part, wherein maintaining the ambient volume within the uncooled tool operating temperature range evaporates the volatile solvent from the layer.

6. The method of claim 1, wherein the metallic build material is ferrous, the method further comprising: applying an attractive magnetic force to the layer while selectively machining the portion of the layer.

7. The method of claim 1, wherein a first layer of the plurality is deposited onto a build plate, such that the build plate supports the part; wherein the build plate comprises an adhesive interface layer arranged between the build plate and the layer.

8. The method of claim 7, wherein sintering the part to form the physical object comprises: removing the build plate with the part from the build volume and inserting the build plate with the part into a furnace.

* * * * *